(12) United States Patent
Sethi et al.

(10) Patent No.: US 8,671,054 B2
(45) Date of Patent: Mar. 11, 2014

(54) DYNAMIC MANAGEMENT AND NETTING OF TRANSACTIONS USING EXECUTABLE RULES

(75) Inventors: Vince Sethi, South Hampton (GB); Andrew Key, Hampshire (GB)

(73) Assignee: JPMorgan Chase Bank, N.A., New York, NY (US)

( * ) Notice: Subject to any disclaimer, the term of this patent is extended or adjusted under 35 U.S.C. 154(b) by 0 days.

(21) Appl. No.: 13/475,364

(22) Filed: May 18, 2012

(65) Prior Publication Data

US 2013/0311358 A1 Nov. 21, 2013

(51) Int. Cl.
*G06Q 40/00* (2012.01)
*G06Q 20/00* (2012.01)

(52) U.S. Cl.
USPC .................................. 705/39; 705/35; 705/68

(58) Field of Classification Search
None
See application file for complete search history.

(56) References Cited

U.S. PATENT DOCUMENTS

| | | | |
|---|---|---|---|
| 5,893,911 A * | 4/1999 | Piskiel et al. ................. | 707/694 |
| 5,978,485 A | 11/1999 | Rosen | |
| 6,169,974 B1 | 1/2001 | Baumgartner et al. | |
| 7,343,364 B2 | 3/2008 | Bram et al. | |
| 7,461,020 B2 * | 12/2008 | Kemper et al. ................. | 705/35 |
| 7,596,526 B2 * | 9/2009 | Blauvelt et al. ................. | 705/37 |
| 7,756,809 B2 | 7/2010 | Weigt et al. | |
| 7,873,566 B1 | 1/2011 | Templeton et al. | |
| 7,991,630 B2 * | 8/2011 | Scalet et al. ...................... | 705/4 |
| 8,024,259 B1 * | 9/2011 | Wilce et al. ..................... | 705/37 |
| 8,086,539 B2 | 12/2011 | Nauman et al. | |
| 8,244,558 B2 * | 8/2012 | Scalet et al. ...................... | 705/4 |
| 8,321,316 B1 | 11/2012 | Kunz et al. | |
| 8,321,339 B2 | 11/2012 | Imrey et al. | |
| 8,332,286 B1 | 12/2012 | Lopes | |
| 8,346,664 B1 | 1/2013 | Klieman et al. | |
| 8,386,383 B1 | 2/2013 | Bent et al. | |
| 8,392,285 B2 | 3/2013 | Hahn-Carlson | |
| 8,407,141 B2 | 3/2013 | Mullen et al. | |
| 2002/0035533 A1 | 3/2002 | Jung et al. | |
| 2002/0103660 A1 * | 8/2002 | Cramon et al. ................... | 705/1 |
| 2002/0152152 A1 * | 10/2002 | Abdelnur et al. ................ | 705/37 |
| 2002/0156716 A1 * | 10/2002 | Adatia ............................ | 705/37 |
| 2002/0188553 A1 * | 12/2002 | Blauvelt et al. ................. | 705/37 |
| 2003/0026404 A1 * | 2/2003 | Joyce et al. .............. | 379/144.01 |

(Continued)

FOREIGN PATENT DOCUMENTS

| | | |
|---|---|---|
| WO | WO2004008367 | 1/2004 |
| WO | WO 2009/037472 | 3/2009 |

OTHER PUBLICATIONS

International Search Report and Written Opinion issued Sep. 19, 2012 in corresponding application PCT/US12/38603.

*Primary Examiner* — Gregory Johnson
(74) *Attorney, Agent, or Firm* — Goodwin Procter LLP

(57) ABSTRACT

Systems and methods for dynamically managing and netting transactions based on one or more sets of netting rules are disclosed. The present invention dynamically associates transactions with one or more collections based on the execution of netting rules to identify transactions that may be ideal for netting and to perform netting operations and calculations accordingly. The present invention may execute the netting rules according to the priority of the netting rule within a rule hierarchy and utilizes unique solutions allowing for the efficient processing of transactions even as netting rules are created, modified and removed from time-to-time. In addition, embodiments of the disclosed netting system utilize denormalized sets of data and maintain a complete audit trail for all operations.

13 Claims, 15 Drawing Sheets

(56) References Cited

U.S. PATENT DOCUMENTS

| | | | |
|---|---|---|---|
| 2003/0033228 A1* | 2/2003 | Bosworth-Davies et al. | 705/35 |
| 2003/0093361 A1* | 5/2003 | Yoshida et al. | 705/37 |
| 2003/0130931 A1* | 7/2003 | Mirlas et al. | 705/37 |
| 2003/0158798 A1* | 8/2003 | Green | 705/30 |
| 2004/0039693 A1* | 2/2004 | Nauman et al. | 705/39 |
| 2004/0078326 A1* | 4/2004 | Strydom et al. | 705/39 |
| 2004/0143539 A1* | 7/2004 | Penney et al. | 705/37 |
| 2004/0236653 A1* | 11/2004 | Sokolic et al. | 705/35 |
| 2005/0010613 A1* | 1/2005 | Lejdstrom et al. | 707/201 |
| 2005/0021454 A1* | 1/2005 | Karpovich et al. | 705/39 |
| 2005/0080703 A1* | 4/2005 | Chiesa et al. | 705/36 |
| 2005/0137953 A1* | 6/2005 | McDonough et al. | 705/36 |
| 2005/0177507 A1* | 8/2005 | Bandych et al. | 705/40 |
| 2005/0192881 A1* | 9/2005 | Scannell | 705/35 |
| 2005/0278251 A1* | 12/2005 | Hahn-Carlson | 705/39 |
| 2006/0085331 A1* | 4/2006 | Imrey et al. | 705/39 |
| 2006/0184437 A1* | 8/2006 | Bruetting et al. | 705/35 |
| 2006/0242061 A1* | 10/2006 | Axilrod | 705/40 |
| 2007/0118455 A1* | 5/2007 | Albert et al. | 705/37 |
| 2007/0118460 A1* | 5/2007 | Bauerschmidt et al. | 705/37 |
| 2007/0136183 A1* | 6/2007 | Roon | 705/37 |
| 2007/0156581 A1* | 7/2007 | Imrey et al. | 705/39 |
| 2007/0239577 A1* | 10/2007 | Grody et al. | 705/35 |
| 2007/0250437 A1* | 10/2007 | Lejdstrom et al. | 705/37 |
| 2008/0015920 A1* | 1/2008 | Fawls et al. | 705/8 |
| 2008/0154769 A1* | 6/2008 | Anderson et al. | 705/40 |
| 2009/0048883 A1* | 2/2009 | Kelly et al. | 705/7 |
| 2009/0157534 A1* | 6/2009 | Arsiwala | 705/30 |
| 2009/0187496 A1* | 7/2009 | Edens | 705/30 |
| 2009/0204643 A1* | 8/2009 | Deffler | 707/201 |
| 2009/0281932 A1* | 11/2009 | Axilrod et al. | 705/30 |
| 2010/0030687 A1 | 2/2010 | Panthaki et al. | |
| 2011/0060629 A1* | 3/2011 | Yoder et al. | 705/14.1 |
| 2011/0153521 A1* | 6/2011 | Green et al. | 705/36 R |
| 2011/0178934 A1* | 7/2011 | Imrey et al. | 705/80 |
| 2011/0258139 A1* | 10/2011 | Steiner | 705/36 R |
| 2012/0078815 A1* | 3/2012 | Rossi et al. | 705/36 R |
| 2012/0123903 A1* | 5/2012 | Yu et al. | 705/26.35 |
| 2012/0136774 A1* | 5/2012 | Imrey et al. | 705/38 |
| 2012/0136776 A1* | 5/2012 | Haberaecker et al. | 705/38 |
| 2012/0209762 A1* | 8/2012 | Metaireau et al. | 705/39 |
| 2012/0254002 A1 | 10/2012 | Kundagrami et al. | |
| 2012/0265708 A1 | 10/2012 | Carney et al. | |
| 2012/0284187 A1 | 11/2012 | Carlson et al. | |
| 2012/0311617 A1* | 12/2012 | Walker et al. | 725/5 |
| 2013/0013507 A1* | 1/2013 | Browning et al. | 705/44 |

\* cited by examiner

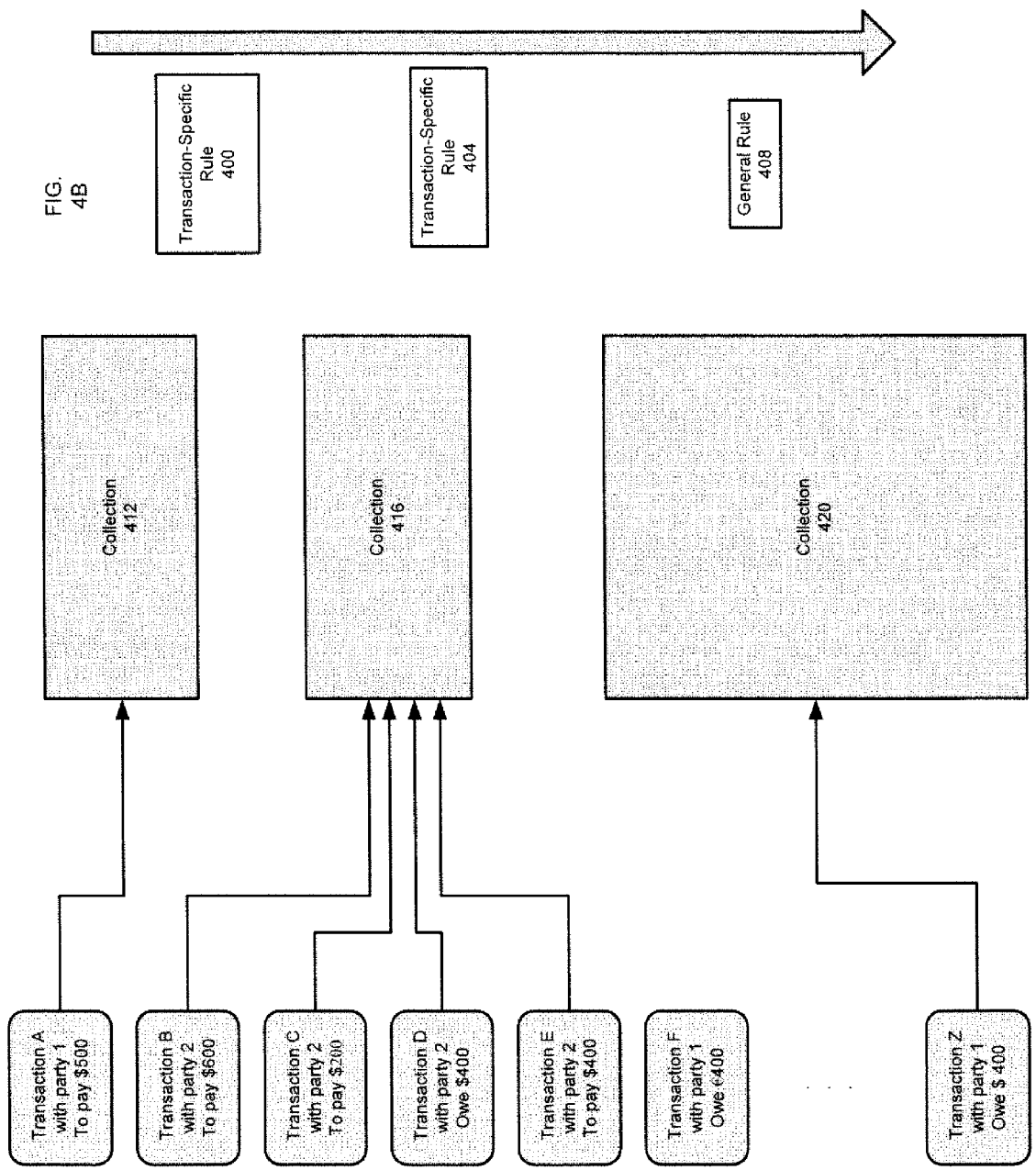

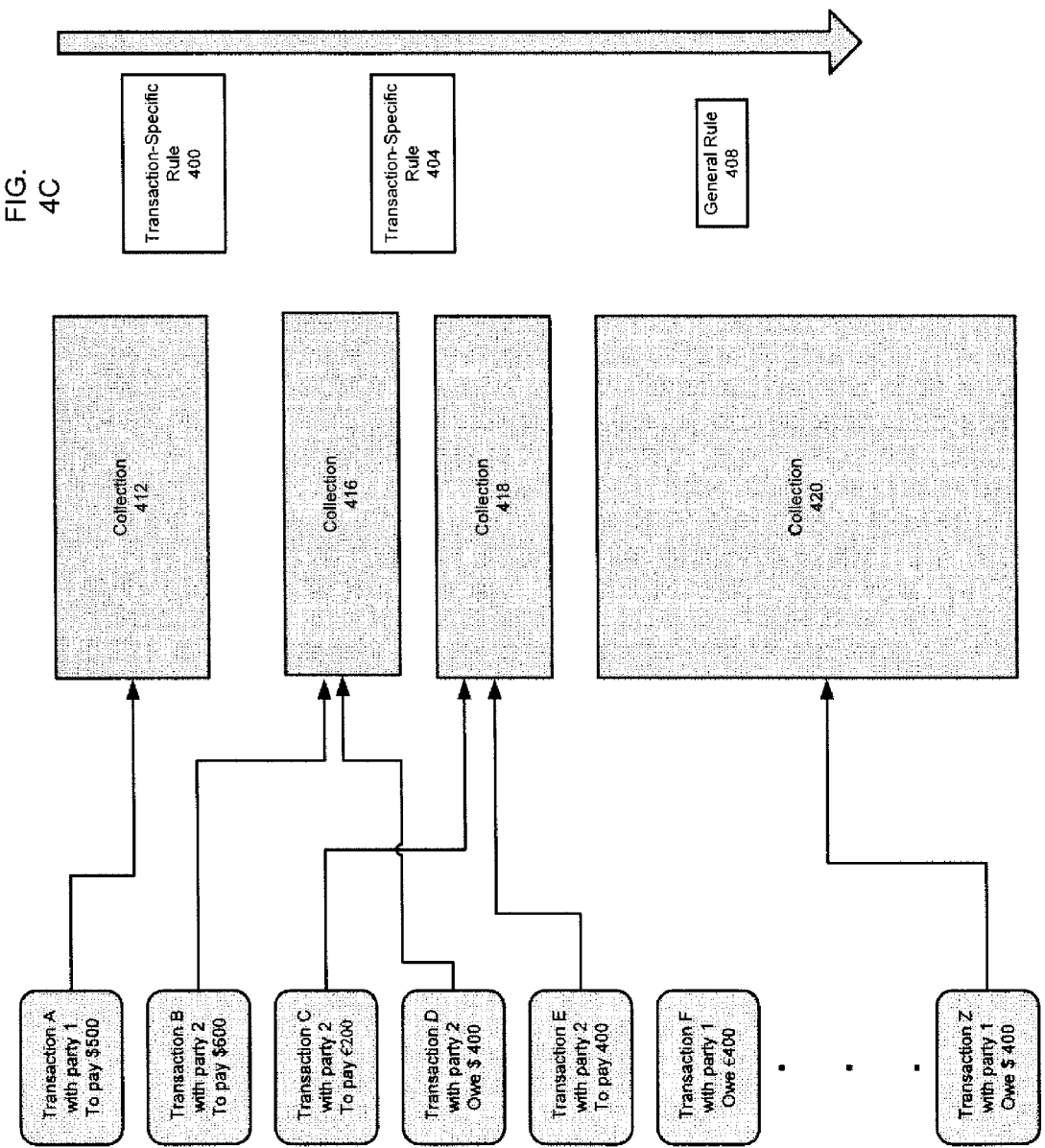

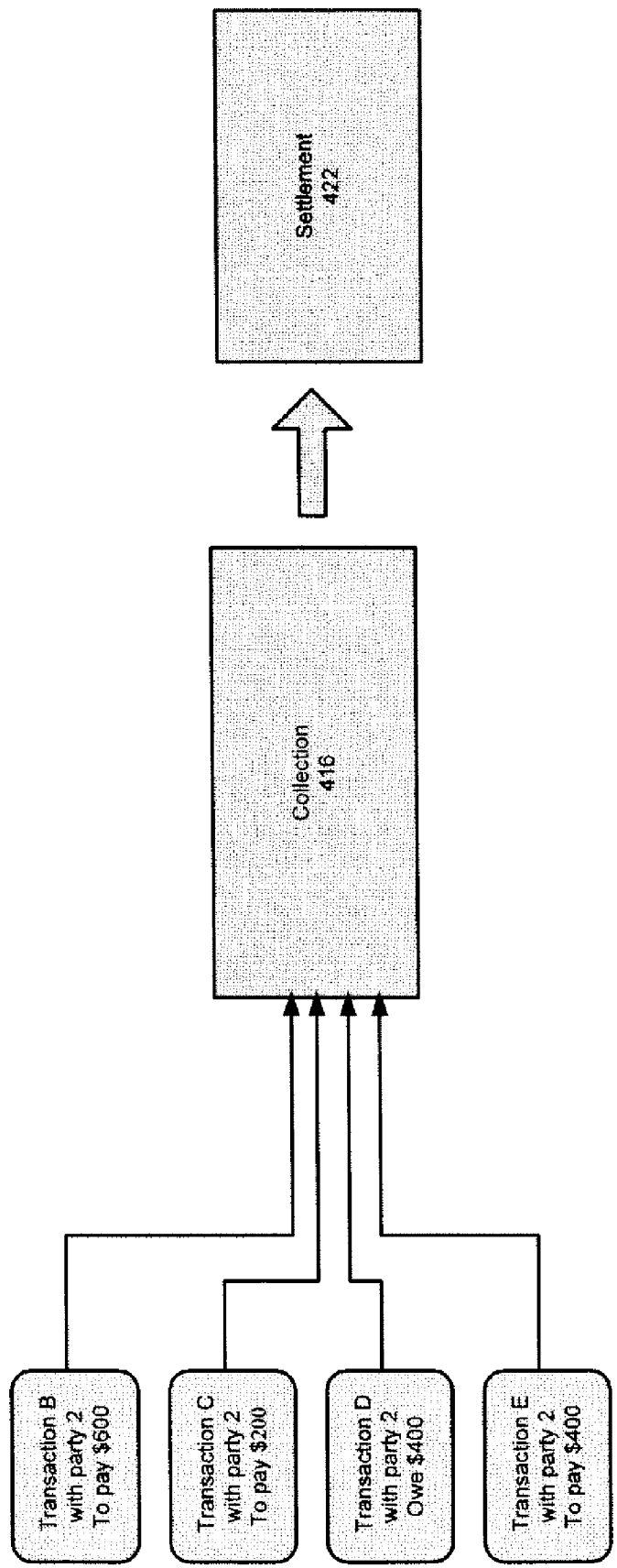

DYNAMIC MANAGEMENT AND NETTING OF TRANSACTIONS USING EXECUTABLE RULES

FIELD OF THE INVENTION

Embodiments of the present invention are related generally to systems and computer-implemented methods for the dynamic management and netting of transactions according to a hierarchy of executable rules.

BACKGROUND OF THE INVENTION

In the financial services industry, investment banks and financial institutions enter into large numbers of transactions every month that often total in the trillions of dollars. Each of these transactions, which may be completed through money markets, foreign exchanges and derivative markets, to name a few, carries inherent credit, settlement and other financial and transactional risks when settled amongst trading partners. This is an especially large concern for investment banks and financial institutions that enter into thousands of transactions each month. In response, various accounting solutions are utilized in the industry to reduce these financial risks.

One such solution, "netting," aggregates the transactional settlement value (e.g., cashflows) from multiple transactions, such as outgoing and incoming cashflows from market trades, in order to create a single settlement type payment on a given payscale. Netting may take several forms. Netting by novation, for instance, is where existing obligations are discharged by replacing them with a new obligation. When two trading partners agree to obligation netting, they are legally bound to net amounts from two or more trades due in the same currency for settlement on the same day. Counterparties in foreign exchange transactions, for example, may be required to settle all of the trades included under the agreement by either making or receiving a single payment, thereby reducing the risk by lowering the number and size of payments that would otherwise be needed to settle the underlying transactions. Another type of netting, close-out netting, is an arrangement to settle all contracted, but not currently due, liabilities to and claims on an institution by one single payment immediately upon the occurrence of one of a list of defined events.

Because many of these transactions often involve the same parties, the financial obligations between these common entities may be aggregated to determine a reduced net obligation. By reducing the total number of settlements between the parties, the operational and settlement risks and costs, the cashflows visible in the market, and the credit exposure to the financial institution, may all be reduced.

Despite being a common accounting technique, the implementation of "netting" in the financial services industry has been rudimentary at best. Indeed, the process of netting is typically initiated manually and with elementary computer systems and solutions. For example, many entities implement the netting technique by utilizing one large database that stores all transactional and settlement obligations. A trader or manager may manually traverse and select the particular transactions from the database to group together the transactions for netting. This, as a person of ordinary skill in the art may recognize, can be time consuming and ultimately inefficient as it may often be difficult to determine which transactions to select among tens of thousands of transactions across multiple markets and currencies involving thousands of different entities, subsidiaries and related corporations. Furthermore, the transactions that are netted and the settlements of such transactions are manually recorded. This is especially burdensome and problematic when the settlement values change from day to day, even after settlement.

Furthermore, the current implementations often require the direct manipulation of the cashflow and/or transaction data within the database, effecting the entities' obligations to track its records for audit and disclosure purposes. As a result, transactional and netting records, if they are kept in the first place at all, are often lost over time as the data is modified in response to changing market conditions and transactions.

While the use of a computer database allows a person to access the data of the transaction, it may, nonetheless, be difficult to find the particular transaction that would benefit the company and reduce financial risks through netting. This is especially difficult in the face of tens of thousands of transactions, each containing variables and settlement requirements that change often.

With the fast-changing nature of day-to-day trades and other transactions, there is, accordingly, a need to dynamically determine the transactions that should be netted, and to determine the net-position of any number of transactions (i.e., how much is owed, or is to be paid, when it is time to settle), even when settlement values change. Furthermore, there is a need to dynamically keep a recorded trail of netting related actions.

SUMMARY OF THE INVENTION

The presently disclosed invention satisfies the above-described needs for an improved system and method for the dynamic management and processing of transactions for netting purposes. Specifically, the invention provides a system and method for dynamically determining, grouping and processing transactions according to netting accounting practices based on a hierarchy of rules that are executable by a processing unit. In the present invention, there may be any number of hierarchal rule levels and, in one preferred embodiment, transaction-specific rules that are executed first and general rules that are subsequently executed if the specific rules do not apply to a particular transaction or cashflow. The netting rules that are created, amended, and/or deleted, may dictate the association of transactions with one or more collections and the determination of the net settlement values.

In one aspect of the present invention, a computer system to dynamically manage transactions for netting one or more transactions associated with a collection is disclosed. The computer system includes a database for storing data of the transactions and a netting engine for performing various operations related to the netting of the transactions. For instance, in one embodiment of the present invention, the netting engine may associate one or more transactions with a collection based on a general rule set and a specific rule set. The netting engine may further determine a net transaction value based on the transactions that are associated with the collection and cause the transaction to settle based on the determined net transaction value.

In one embodiment of the present invention, the netting engine may associate the one or more transactions with a collection based on a rule in the specific rule set. The netting engine may also associate the transactions with a collection based on a rule in the general rule set, where the transactions are not associated with at least one collection based on a rule in the specific rule set. In one preferred embodiment, the netting data contained in the database may include a rule identifier for each of the transactions, identifying the rule associated with the transaction, if any.

In yet another embodiment of the present invention, the netting engine may automatically associate a transaction with and/or disassociate a transaction from a collection when the transaction is added, amended or removed. Further, in another embodiment, the netting data in the database may be automatically updated in response to the associating, determining and causing operations of the netting engine. In yet one other embodiment, the present invention will further include a rule engine for managing the rules. The rule engine, in one instance, may have the capability to automatically generate one or more rules in the general rule set or the specific rule set.

In another aspect of the present invention, a netting system is disclosed for netting one or more transactions that are associated with a collection in accordance with a netting rule. The computer system may include a denormalized transaction database, which includes data for each of the one or more transactions, such as a rule identifier. The disclosed netting system may also include a netting engine to perform various operations using a processor. For example, it may be capable of associating the one or more transactions with the collection in accordance with a general rule set and a specific rule set, determining a net transaction value for the collection, and causing a settlement of the one or more transactions associated with the collection based on the determined net transaction value.

In one embodiment, the netting engine may associate one or more transactions with a netting rule in response to the updating of the rule identifier to identify the netting rule associated with a transaction. This may cause the transaction to be associated with a collection that may be associated with the netting rule. In response to the updating of the rule identifier with a value of null, the netting engine may disassociate the one or more transactions with a netting rule. This may also cause the transaction to be associated with a different collection, such as a general collection. In yet another embodiment, the netting engine will associate the one or more transactions with a collection if the one or more transactions are not associated with at least one collection based on a rule in the general rule set.

In yet another aspect of the present invention, a method of netting one or more transactions according to a netting rule is disclosed, which may include the steps of associating the one or more transactions with a collection in accordance with a general rule set and a specific rule set, determining a net transaction value for the collection, and causing a settlement of the one or more transactions associated with the netting group based on the determined net transaction value.

In one other aspect of the present invention, a computer system to dynamically manage transactions for netting one or more transactions associated with a collection is disclosed to include a database, a netting engine and a rule engine. The database may be stored in memory and may include netting data of one or more transactions. This netting data may include a rule identifier for each of the one or more transactions. Furthermore, the netting engine may utilize processor components to perform various operations including automatically associating one or more transactions with a general collection in accordance with a rule in a general rule set in response to the adding of the one or more transactions and automatically updating the netting data in response. In addition, the netting engine may automatically associate the one or more transactions with a specific collection in accordance with a rule in a specific rule set in response to the modifying of the rule identifier to identify the rule associated with the transaction. It may further determine a net transaction value for the netting group associated with the one or more transactions and cause a settlement of the one or more transactions associated with the netting group based on the determined net transaction value. Furthermore, the engine may automatically update the netting data associated with the transactions in response to the settlement. In addition, the rule engine may automatically generate rules, each of which may define attributes of the one or more transactions based on the transaction's currency, trading partner, amount of the transaction, and/or date of the transaction.

BRIEF DESCRIPTION OF THE DRAWINGS

In order to facilitate a fuller understanding of the present invention, reference is now made to the accompanying drawings, in which like elements are referenced with like numerals. These drawings should not be construed as limiting the present invention, but are intended to be exemplary only.

FIG. 4B is a block diagram illustrating the associations between transactions, collections, settlements and netting rules in response to operations performed by the netting system in accordance with embodiments of the invention.

FIG. 4C is a block diagram illustrating alternate associations between transactions, collections, settlements and netting rules in response to operations performed by the netting system in accordance with embodiments of the invention.

FIG. 4D is a block diagram illustrating the associations between transactions, collections, settlements and netting rules in response to the netting of a collection of transactions in accordance with embodiments of the invention.

DETAILED DESCRIPTION OF THE INVENTION

Embodiments of the presently disclosed invention are directed to a system and method for the management and netting of financial transactions.

Figure 1A:
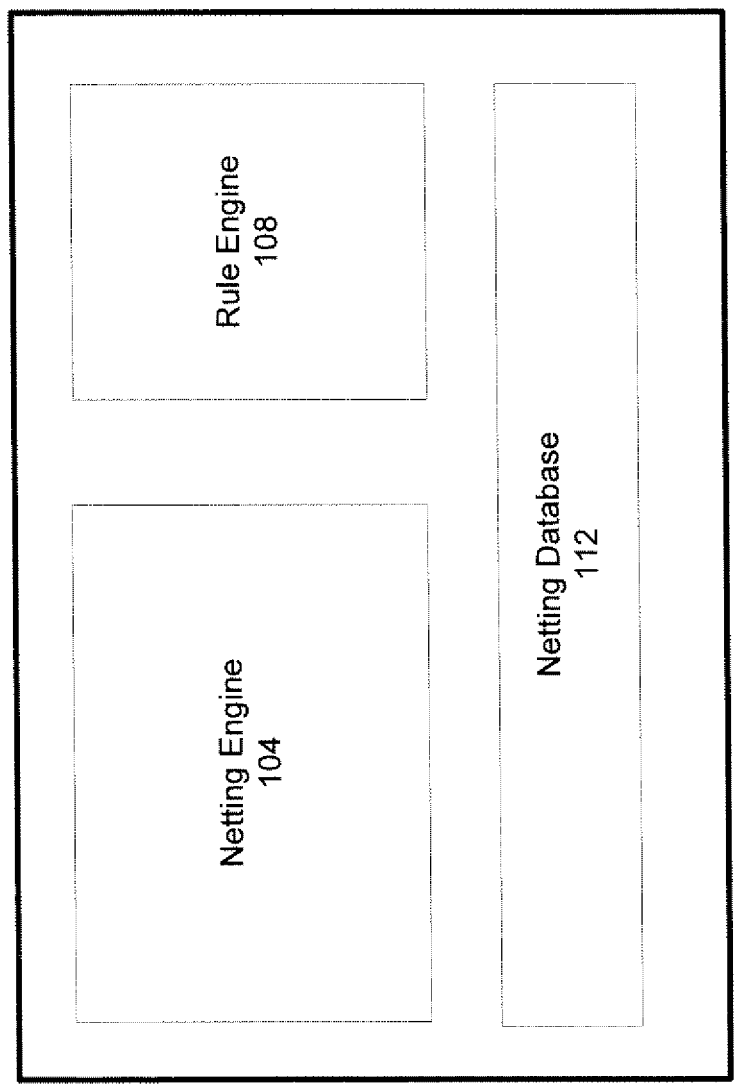
FIG. 1A is a block diagram illustrating a netting system in accordance with an embodiment of the invention.

FIG. 1A is a block diagram illustrating a netting system 100 in accordance with an embodiment of the present invention, comprising a netting engine 104, a rule engine 108 and a netting database 112. A broad overview of the invention will be discussed, followed by a more detailed discussion of the capabilities and features of the netting database 112, the rule engine 108 and the netting engine 104.

The netting system 100 facilitates the netting of transactions by dynamically managing the transactions of the entity, identifying the transactions that may be ideal for netting, determining their net settlement value, and causing the settlement of the transactions. The netting system 100 performs these tasks in accordance with one or more sets of netting rules that may be configured to be hierarchal in nature. The netting system 100 dynamically performs these tasks even as transactions are completed, modified and removed from the system. Similarly, the present invention contains unique features that allow transactions to be efficiently and dynamically assigned to one or more collections even as nettings rules are created, modified or deactivated.

The presently disclosed invention may be used by an investment bank that participates in trading in a number of financial markets and which seeks to reduce the risks in settling transactions. While the exemplary systems and methods described are shown to manage the netting of trades and derivatives in the financial industry, the present invention may be put into practice in any industry to manage financial transactions and the settlements between trading partners. For example, the netting system 100 may also be configured for use by a manufacturing company that purchases resources and sells products.

The netting system 100 receives transactions as they are completed and store the transaction information within the netting database 112, along with various other data. In operation, the netting system 100 may generate and utilize denormalized sets of data at the netting database 112 containing information about each transaction, along with reference and other information that is utilized in the operation of the netting system 100. Such information may include each transaction's associations with other transactions, collections, netting rules and settlements. Other embodiments may store and utilize the original transaction data as it is received at the netting system 100. The netting database 112 may also store all versions of transactions, collections, rules and settlements as they are created, modified, and removed.

The netting system 100 may not process transactions received for netting (e.g., associate a transaction with a collection for netting), until such transactions are made available for netting. In certain embodiments, the generation of a denormalized transaction data page at the netting database 112 automatically causes the netting system 100 to process the transaction for netting. In several other embodiments, this occurs when a flag or other indicator within a transaction data page is triggered (e.g., when a data value is set to "true").

Once a transaction is available to be processed by the netting system 100, the netting system 100 may associate the transaction to one or more collections according to configurable netting rules that define the specific transaction or the type of transaction that should be associated with a particular collection. Thus, a collection may identify to a user a set of transactions having similar attributes, which the user may then use to select one, some or all transactions within the collection from which to perform netting. A collection may also identify specific transactions, as specifically chosen by a user for netting. This may, in several embodiments, cause the automatic generation of one or more netting rules which then results in the association of the transactions with a collection.

The netting system 100 may be configured to execute netting rules in order of priority according to a configurable rules hierarchy. Certain types of rules may have priority over others, wherein higher priority rules will control a transaction's association over lower priority rules. In the preferred embodiment, there are two levels of rules: general rules and transaction-specific rules. When a transaction is received, the netting engine 104 may associate the transaction with a collection by executing or processing one or more of such netting rules configured at the netting system 100.

The association of transactions to a particular collection may also be performed at the creation, modification or removal of one or more netting rules by a user. For example, the rule engine 108 may automatically generate a rule and the netting engine 104 may automatically associate the transactions with a collection in response to a user selecting transactions for netting. Associations with collections may also be determined by the netting engine 104 in response to the modifications or removal of transactions previously received at the netting system 100.

Once transactions have been associated with a collection, the netting engine 104 may automatically determine the net transaction value for the collection according to netting accounting practices that are utilized and well known in the art by a person of ordinary skill. The netting engine 104 processes the settlement value of each of the transactions in a collection, such as by aggregation. Other manners of calculating the net settlement value may be used. The calculation of the net settlement value may be automatic when a collection is created or modified, at regular intervals, or upon the command of the user.

In practice, once the net settlement values of a set of transactions are known, the netting engine may provide a user of the system with the information for approval of the settlement via a user interface. In one simple embodiment, the user of the system may communicate the transactions and settlement information with the trading partner through traditional methods such as by telephone or email. This negotiation and approval process may alter the transactions that are to be settled and the settlement values. Once the trading partner has approved the settlement, the user of the system may indicate to the netting system that the settlement has been approved. In several embodiments, discussed in detail in other portions of this disclosure, the approval and negotiation process may be built into the system, allowing the negotiation and approval of settlements to be performed seamlessly between the netting system 100 and the trading partner and its system(s).

Once a collection of transactions has been approved for settlement, the netting engine 104 may cause the transactions associated with the collection to be settled according to the agreed upon net settlement value. For example, the netting engine 104 may cause an engine with settlement capabilities to settle the particular transactions according to the determinations of the netting engine 104. The netting engine 104 may communicate to this settlement engine the specific transactions that should be settled and the parties involved, for example. In another embodiment, the netting engine may have such settlement capabilities built in.

In either case, the net settlement value may be delivered to the trading partner and the trading partner may be notified of the settlement. Information as to how the net settlement value was calculated may be provided to the trading partner as well. In one embodiment, the settlement may be scheduled according to a determined payment schedule. Once the settlement has been completed, the netting engine 104 will update the netting database 112 with the settlement information, which may include the settlement value, the time of settlement, and the trading partners involved. The netting engine 104 may also associate the settlement information with the collection information within the netting database 112 such as by including reference information. Furthermore, the netting engine 104 may record the settlement information with each of the transactions associated with the collection settled. At the same time, the transactions data in the netting database 112 may each, individually, be marked as settled.

Figure 1B:
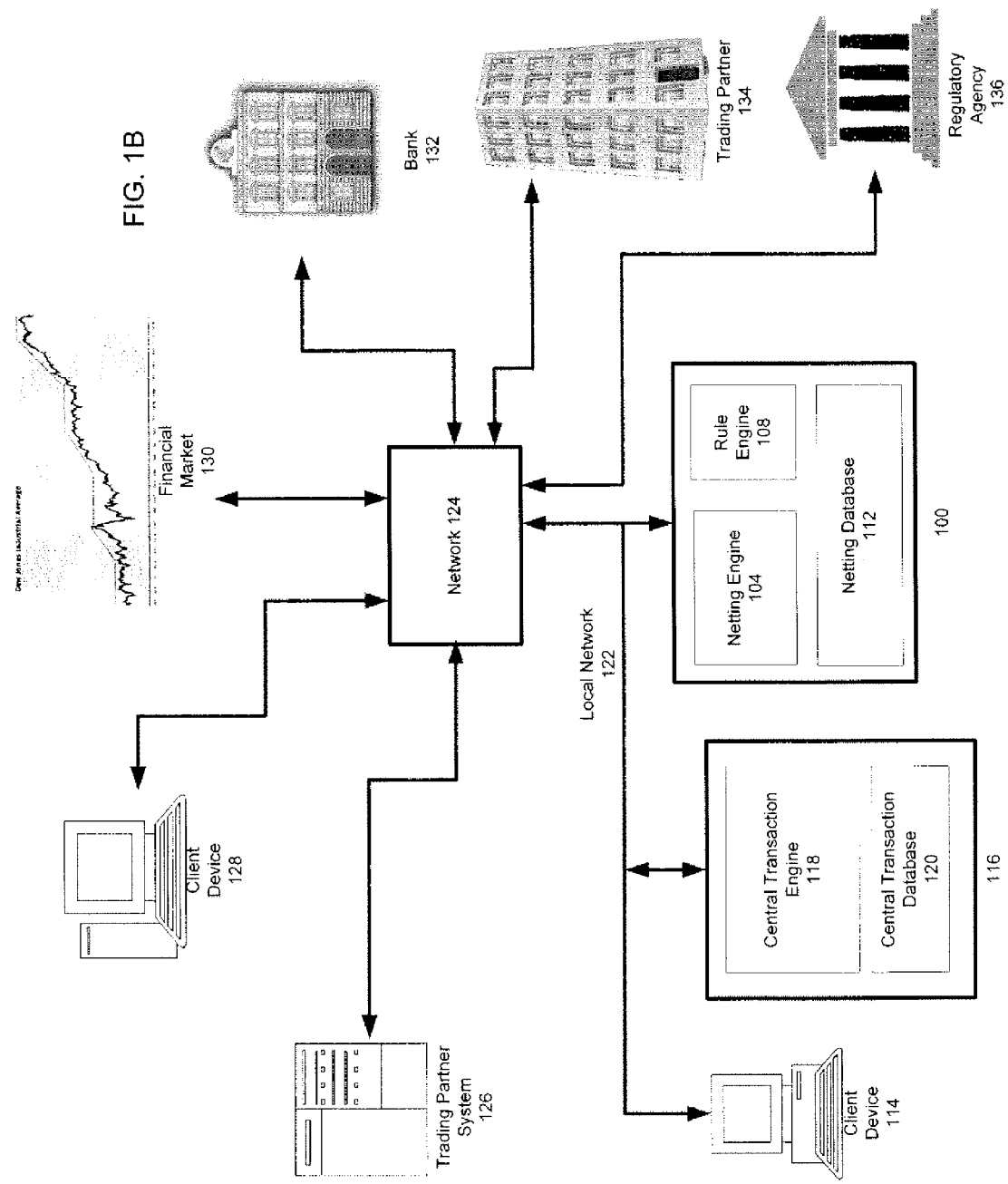
FIG. 1B is a block diagram illustrating an operating environment for the netting system in accordance with an embodiment of the invention.

As depicted in FIG. 1B, the netting system 100 may be connected to a client device 114 over a local network 122, which may be used by a user to view the pending transactions at the netting system 100, to select transactions for nettings, to determine net settlement value, to settle transactions, and to create rules, to name a few capabilities.

Furthermore, the netting system 100 may be connected, via the local network 122, to a central transaction system 116, which facilitates an entity's day-to-day transactional operations. For example, the central transactions system 116 may allow a company to complete trades in a number of financial markets. Similarly, the central transaction system 116 may facilitate the completion of transactions with other companies and entities. The operations of the central transaction system 116 may be controlled by a central transaction engine 118 and the data of transactions utilized by the engine 118 may be recorded at a central transaction database 120. In operation, transactions that are completed and entered into at the central transaction system 116 may automatically be received and processed at the netting system 100 in response.

In another embodiment of the present invention, the netting system 100 may simply be incorporated into the central transaction system 116. Thus, it would be readily apparent to one of ordinary skill in the art that the present invention can be adapted to operate with existing systems of corporations and entities with minimal cost. In effect, any company with an existing transaction infrastructure may greatly expand the capabilities of its transaction system(s) to include the ability to automatically perform netting operations without having the need to export sensitive company transaction data to an external system, which tend to come with increased security risks, financial risks, and operational costs. It would be apparent to one of ordinary skill in the art that the central transaction system 116 may contain additional engines, databases, and components or may contain only one or more of the engines and/or databases depicted. Further, central transaction system 116 may contain communication channels not shown, such as communication channels with other internal and external systems well known in the art.

The netting system 100 may further be connected to a network 124, which allows it to connect to a plurality of devices and systems including trading partner system 126, client device 128, financial market 130, bank 132, trading partner 134, and regulatory agency 136. A user of the netting system 100 may access the system from client device 128 to create a netting rule and to perform netting operations, for example. Furthermore, the netting system 100 may communicate with trading partner system 126, financial market 130, bank 132, and trading partner 134 to complete settlements with trading partners and to deliver netting information as needed. Similarly, the netting system 100 may communicate with regulatory agency 136, such as the Securities and Exchange Commission, the Financial Industry Regulatory Authority (FINRA), state and local regulators, and other regulatory agencies. The netting system 100 may transmit and disclose the transactions that have been settled including the settlement value. Such disclosure may be in a form that may be processed by a computer system of the regulatory agency 136, including by use of an application programming interface (API) or be as simple as disclosure documents well known in the art. Through the use of network 124, the netting system 100 may also allow the regulatory agency to have access to the netting system 100 including a portion (e.g., public portion) of the netting database 112, thereby allowing the agency to track transactions that may be settled and to analyze the data accordingly. The netting system 100 may also be configured to allow access by agents of the regulatory agency 136, at predetermined periods according to regulations, to examine the financial transactions and settlements. The regulatory agency 136 may, therefore, have access to all transactions, collections, rules and settlements including versions of each over time. The netting system 100 may be configured to automatically transmit transaction, netting/settlement records to the regulatory agency 136 at regular or required time intervals in accordance with financial regulations of the regulatory agency 136. The netting system 100 may also be configured to automatically generate the financial disclosures, inputting various financial data (aggregated or otherwise) into disclosure forms and formatting the disclosure data as required. Such actions may be configured to take place at regular predetermined times or upon command.

Generally, it should be noted that the components depicted and described herein above may be, or include, a computer or multiple computers. Although the components are shown as discrete units, all components may be interconnected or combined. The components may be described in the general context of computer-executable instructions, such as program modules, being executed by a computer. Generally, program modules include routines, programs, objects, components, data structures, etc., that perform particular tasks or implement particular abstract data types.

Those skilled in the art will appreciate that the invention may be practiced with various computer system configurations, including hand-held wireless devices such as mobile phones or PDAs, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

Computers typically include a variety of computer readable media that can form part of the system memory and be read by the processing unit. By way of example, and not limitation, computer readable media may comprise computer storage media and communication media. The system memory may include computer storage media in the form of volatile and/or nonvolatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by a processing unit. The data or program modules may include an operating system, application programs, other program modules, and program data. The operating system may be or include a variety of operating systems such as Microsoft Windows® operating system, the Unix operating system, the Linux operating system, the Xenix operating system, the IBM AIX™ operating system, the Hewlett Packard UX™ operating system, the Novell Netware™ operating system, the Sun Microsystems Solaris™ operating system, the OS/2™ operating system, the BeOS™ operating system, the Macintosh™® operating system, the Apache™ operating system, an OpenStep™ operating system or another operating system or platform.

At a minimum, the memory includes at least one set of instructions that is either permanently or temporarily stored. The processor executes the instructions that are stored in order to process data. The set of instructions may include various instructions that perform a particular task or tasks, such as those shown in the appended flowcharts. Such a set of instructions for performing a particular task may be characterized as a program, software program, software, engine, module, component, mechanism, or tool. The computer 400 may include a plurality of software processing modules stored in a memory as described above and executed on a processor in the manner described herein. The program modules may be in the form of any suitable programming language, which is converted to machine language or object code to allow the processor or processors to read the instructions. That is, written lines of programming code or source code, in a particular programming language, may be converted to machine language using a compiler, assembler, or interpreter. The machine language may be binary coded machine instructions specific to a particular computer.

Any suitable programming language may be used in accordance with the various embodiments of the invention. Illustratively, the programming language used may include assembly language, Ada, APL, Basic, C, C++, COBOL, dBase, Forth, FORTRAN, Java, Modula-2, Pascal, Prolog, REXX, JavaScript, and various XML-based programming languages such as XQuery, XMLT, XSL, Xpath, and others. Further, it is not necessary that a single type of instruction or programming language be utilized in conjunction with the operation of the system and method of the invention. Rather, any number of different programming languages may be utilized as is necessary or desirable.

In addition, the instructions and/or data used in the practice of the invention may utilize any compression or encryption technique or algorithm, as may be desired. An encryption module might be used to encrypt data. Further, files or other data may be decrypted using a suitable decryption module.

The computing environment may also include other removable/nonremovable, volatile/nonvolatile computer storage media. For example, a hard disk drive may read or write to nonremovable, nonvolatile magnetic media. A magnetic disk drive may read from or write to a removable, nonvolatile magnetic disk, and an optical disk drive may read from or write to a removable, nonvolatile optical disk such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media is typically connected to the system bus through a removable or non-removable memory interface.

The processing unit that executes commands and instructions may be a general purpose computer, but may utilize any of a wide variety of other technologies including a special purpose computer, a microcomputer, mini-computer, mainframe computer, programmed micro-processor, micro-controller, peripheral integrated circuit element, a CSIC (Customer Specific Integrated Circuit), ASIC (Application Specific integrated Circuit), a logic circuit, a digital signal processor, a programmable logic device such as an FPGA (Field Programmable Gate Array), PLD (Programmable Logic Device), PLA (Programmable Logic Array), RFID processor, smart chip, CPLD (Complex Programmable Logic Device), or any other device or arrangement of devices capable of implementing the steps of the processes of the invention.

It should be appreciated that the processors and/or memories of the computer system need not be physically in the same location. Each of the processors and each of the memories used by the computer system may be in geographically distinct locations and be connected so as to communicate with each other in any suitable manner. Additionally, it is appreciated that each of the processors and/or memory may be composed of different physical pieces of equipment.

A user may enter commands and information into the computer through a user interface that includes input devices such as a keyboard and pointing device, commonly referred to as a mouse, trackball or touch pad. Other input devices may include a microphone, joystick, game pad, satellite dish, scanner, voice recognition device, keyboard, touch screen, toggle switch, pushbutton, or the like. These and other input devices are often connected to the processing unit through a user input interface that is coupled to the system bus, but may be connected by other interface and bus structures, such as a parallel port, game port or a universal serial bus (USB).

One or more monitors or display devices may also be connected to the system bus via an interface, in addition to display devices, computers may also include other peripheral output devices, which may be connected through an output peripheral interface. The computers implementing the invention may operate in a networked environment using logical connections to one or more remote computers, the remote computers typically including many or all of the elements described above.

Various networks may be implemented in accordance with embodiments of the invention, including a wired or wireless local area network (LAN) and a wide area network (WAN), wireless personal area network (PAN) and other types of networks. When used in a LAN networking environment, computers may be connected to the LAN through a network interface or adapter. When used in a WAN networking environment, computers typically include a modem or other communication mechanism. Modems may be internal or external, and may be connected to the system bus via the user-input interface, or other appropriate mechanism. Computers may be connected over the Internet, an Intranet, Extranet, Ethernet, or any other system that provides communications. Some suitable communications protocols may include TCP/IP, UDP, or OSI, for example. For wireless communications, communications protocols may include Bluetooth, Zigbee, IrDa or other suitable protocol. Furthermore, components of the system may communicate through a combination of wired or wireless paths.

Although many other internal components of the computer are not shown, those of ordinary skill in the art will appreciate that such components and the interconnections are well known. Accordingly, additional details concerning the internal construction of the computer need not be disclosed in connection with the present invention.

The various embodiments and features of the presently disclosed invention may be used in any combination as the combination of these embodiments and features are well within the scope of the invention. While the foregoing description includes many details and specificities, it is to be understood that these have been included for purposes of explanation only, and are not to be interpreted as limitations of the present invention. It will be apparent to those skilled in the art that other modifications to the embodiments described above can be made without departing from the spirit and scope of the invention. Accordingly, such modifications are considered within the scope of the invention and are intended to be encompassed by the following claims and their legal equivalents.

In certain embodiments of the present invention, the components of the netting system 100 may be located at any number of locations that are connected to local network 122 or to network 124. The netting engine 104 may operate by communicating with rule engine 108 and transaction database 112 by utilizing a network such as local network 122 or to network 124.

Having described the general operations at the netting system 100, the netting rules, as utilized by the system 100, will now be discussed, followed by a detailed description of the operations and capabilities of the engines and databases making up the netting system 100.

Netting Rules

Netting rules are configurable policies that associate one or more transactions with a particular collection when processed or executed at the netting system 100. Therefore, netting rules may be used to group similar types of transactions together for a better understanding of the transactions that are eligible for netting. Even further, netting rules may be used to associate particular transactions to a collection for processing according to netting accounting practices and for determining a net settlement value.

A netting rule is said to "capture" a transaction if the transaction has all of the attributes that are required by a netting rule. For example, a netting rule may be defined to capture all transactions from a particular trading partner having a settlement value over $1000. A user of the system, for instance, may define the transactional attributes and the conditions for association to a collection, based, at least in part, on these attributes. When a netting rule is executed (i.e., processed by the netting system 100), all transactions meeting the requirements defined by the netting rule will be associated with a collection.

A netting rule may also define what actions should be taken when a transaction having such attributes are found within the system, including which collection(s) to associate with a transaction, when to associate the transaction to a collection, when to perform netting, and whether to complete the settlement of the transaction automatically, to name a few.

A configurable hierarchy of netting rules determines which netting rules may control when more than one such rule captures a particular transaction. In the preferred embodiments of the present invention, there are two types—or levels—of netting rules: general rules and transaction-specific rules. General rules may be utilized to organize the transactions into one or more collections according to one or more definable attributes of the transactions. General rules may also be used to allow a user to understand the various transactions that may require settlement. For example, a user may organize the transactions for viewing or for netting according to the value of the transaction, placing transactions with a value of less than $100 in one collection, transactions with a value from $100 to $1000 in a separate collection, and transactions with a value greater than $1000 in yet another collection. A transaction may also be associated with a collection if the transaction is a trade through a particular financial market, such as the NASDAQ stock exchange. In another embodiment, it may also be preferable to associate all transactions involving a particular entity with a collection. This is especially useful where that entity is involved in a large number of transactions. In yet another embodiment, it may be preferable to group all transactions that are completed using a particular currency, such as the Dollar. A person of ordinary skill in the art would recognize that with this feature, any number and variety of attributes may be used to monitor transactions having particular attributes ideal for netting. A general rule may also be used to organize transactions into one or more groups for netting based on such attributes. A user, therefore, may not only organize types of transactions into discernable groups, but the user may also select any of these collections for netting.

Transaction-specific rules, in contrast, identify specific transactions that have been selected by a user or administrator for netting. As such, a user may utilize a user interface to select a transaction or enter a transaction identifier to generate a transaction-specific rule. The result is a collection containing the selected transactions.

The transaction-specific rules may further be defined to assign particular transactions that have been selected into one of several collections for netting based on the attributes of the transaction, similar to general rules. For example, of the transactions that are selected for netting, transactions with trading partner A may automatically be associated with a collection while transactions with trading partner B may be associated with another collection, for example.

Notably, in a preferred embodiment, transaction-specific rules are exclusive in scope. In other words, a transaction (including subsequent versions) may be captured by only one transaction-specific rule. This allows for efficient processing of transactions and their associations to collections when rules are created, modified or deleted.

The transaction-specific rules, also, have priority over the general rules. That is, it may first be determined whether a transaction is associated with a collection according to the transaction-specific rules. Only when a transaction is not associated with a collection according to these rules, are the general rules examined.

It should be readily apparent to a person of ordinary skill in the art that any number of types of rules with any hierarchy of netting rules may be used and are well within the scope of the presently disclosed invention. Furthermore, it is further well within the scope of the present invention to implement the present invention to utilize netting rules that are not exclusive in nature. For example, rather than having netting rules that are exclusive in nature, each level of rules in a hierarchy of rules may be prioritized such that when a transaction may be captured by two or more rules, the priority information may automatically determine which rule should be applied. As another example, where there are two or more rules that capture a particular transaction, both rules may be applied to the transaction. In such cases, a transaction may be associated with a number of collections based on these rules.

Netting Database

Figure 2A:
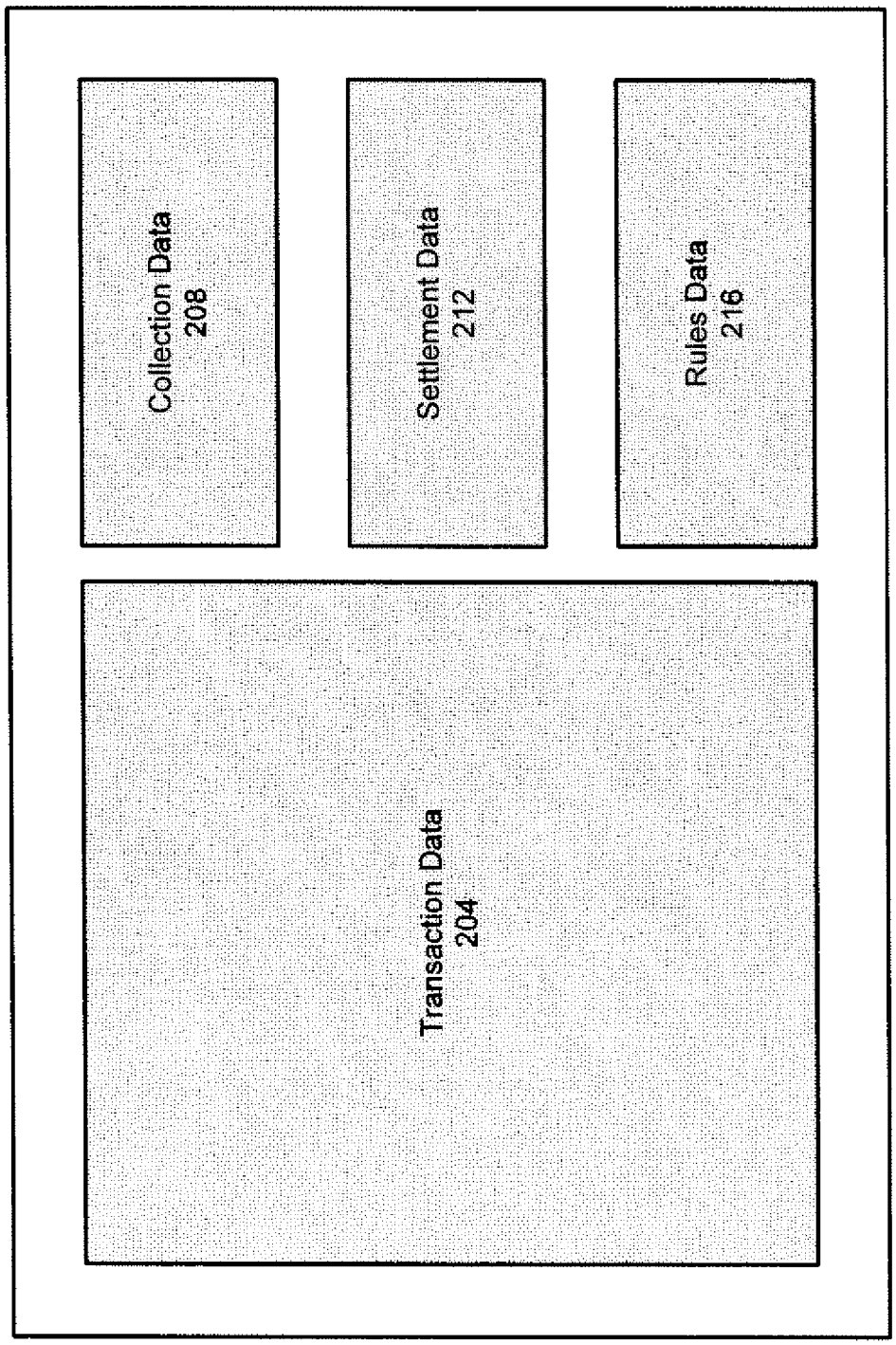
FIG. 2A is a block diagram illustrating a netting database in accordance with an embodiment of the invention.

The netting database 112 is utilized by netting engine 104 in managing transactions of the system, associating the transactions with collections for netting, and tracking netting, transaction and settlement data over time. FIG. 2A depicts a block diagram of a netting database 200 in accordance with at least one embodiment of the present invention, containing transaction data 204, collection data 208, settlement data 212, and rules data 216.

The transaction data 204 of the netting database 200 contains a plurality of data pages, each corresponding to a transaction that is received at the netting system. Each transaction that is received at the netting system 100 may contain a settlement amount, which is an amount that is owed to a trading partner, or conversely, an amount that the trading partner may owe. This value may be identified and will be referred to herein as a settlement value (i.e., the amount that is to be transferred upon settlement). In one embodiment, the settlement amount in each transaction page is a positive amount indicating the absolute value for settlement. In addition, each transaction page may contain information indicating whether the amount is to be paid or to be received. In another embodiment, a positive settlement data value in a transaction page indicates the settlement amount to be paid to the trading party while a negative settlement data value may indicate an amount that is owed by that party.

Figure 2B:
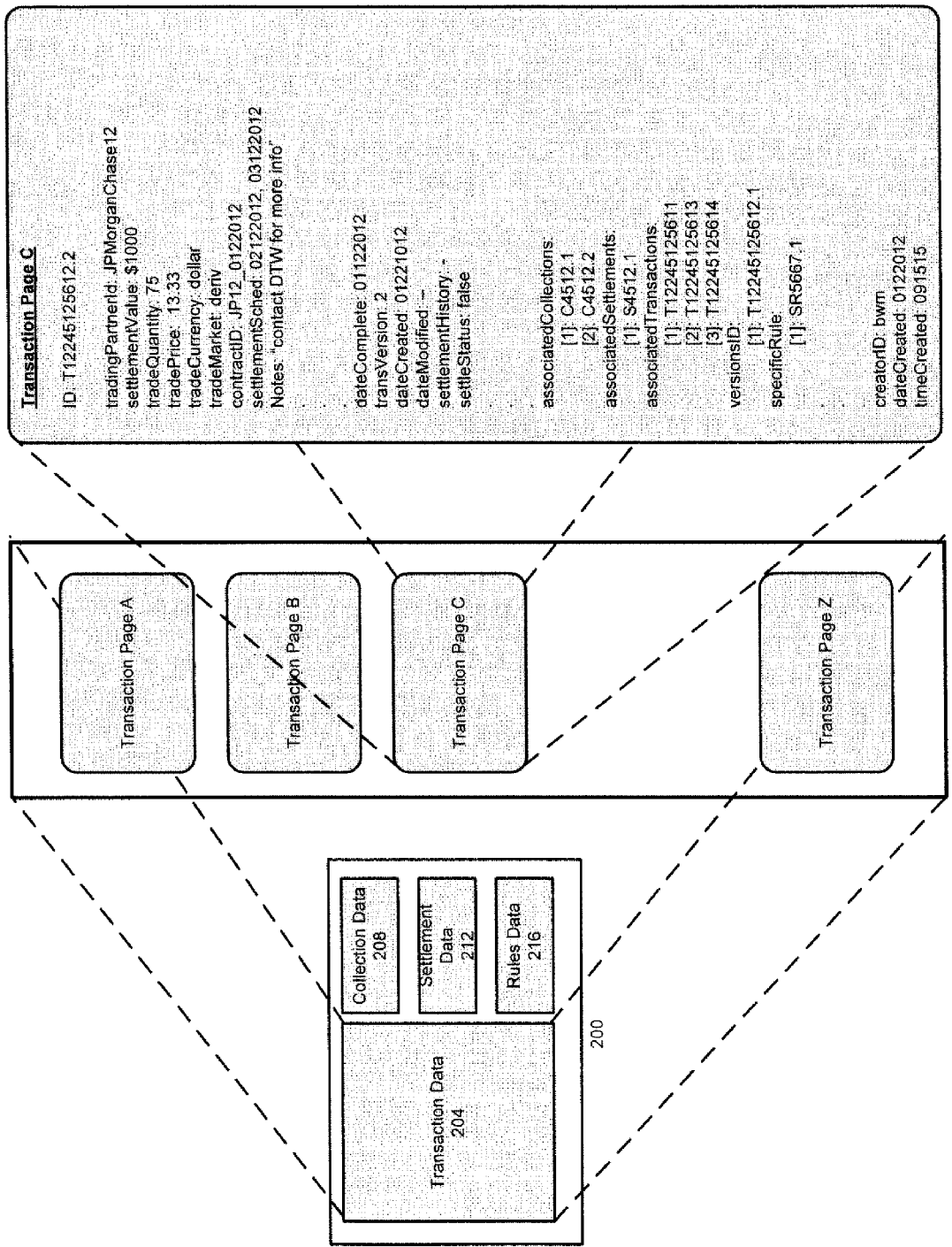
FIGS. 2B-E are block diagrams illustrating the data content of the netting database in accordance with an embodiment of the invention.

An exemplary transaction page is depicted in FIG. 2B. As seen, each transaction page may include: a unique transaction identifier, the parties involved (e.g., trading partner, company X), the transaction settlement value, the trade quantity and price (e.g., 100 shares for 500), the currency (e.g., the Euro), the trading market if applicable (e.g., derivatives market), corresponding transaction contract, if any, the settlement schedule (e.g., to settle within 30 days of trade), and any other stipulations or notes that may have been agreed upon by the parties. Other information may be included depending on the transaction type, the commodities involved, and the financial market utilized, as would be understood by a person of ordinary skill in the art. A transaction page may contain additional information that facilitates the operations of the netting system including time and date of when the trade was entered and received, the date and time the transaction data page was generated and the version of the transaction page, the settlement status, the settlement history, the date that it was last modified etc., (also depicted in FIG. 2B).

Each transaction page may further contain reference data, allowing the netting engine 104 and rule engine 108 to determine the transaction page's relationship with other transactions. For example, in the trades of derivatives, multiple transactions (i.e., cashflows), may be agreed upon by the parties at one time. Each transaction data page for such transactions, therefore, may reference other transaction pages, allowing a user of the system to quickly determine related cashflows, such as those making up a single trade of derivatives. For example, the transaction shown in FIG. 2B is related to three other transactions which are identified within the transaction page by their transaction identifiers (i.e., T12245125611, T12245125613, and T12245125614). Note that transactions, as with collections, settlements and rules, may be referenced by an identification number that makes no reference to its version. In operation, the engines of the netting engine 104 may have the capability to determine, based on the transaction identifier, the most up-to-date version of the transaction, collection, settlement, or rule that is referenced.

In some embodiments, each transaction data page may also contain reference information of the collection that a transaction page is associated with and the settlement pages related to such collections, allowing a user to determine which collection a transaction is associated with and any settlements that may have taken place.

Each transaction page may further contain reference data of a transaction's association with one or more netting rules. In a preferred embodiment, the transaction pages may identify a transaction's associated general or transaction-specific rule. The netting engine 104 may utilize such data in determining the association of transaction to a particular collection. By storing and tracking the transaction-specific rule from which a transaction is captured, the netting engine 104 may efficiently process a transaction when a transaction-specific rule is created, modified or deleted. Indeed, as discussed with respect to the netting engine 104 and in other portions of this detailed description, the use of such reference data allows the netting engine 104 to avoid the reexecution all transaction-specific rules and save processing resources. For example, if a transaction-specific rule is removed, the transactions that are captured by the transaction-specific rule prior to its modification may be determined and their disassociation from a corresponding collection may be processed efficiently. In such cases, rather than having to reexecute all transaction-specific rules-which may number in the tens of thousands-only the general rules may be reexecuted. This is discussed in further detail with regard to the operations of the netting engine 104.

The transaction data 204 contains a transaction page for each version of a transaction. When information contained within a transaction page is modified, a new transaction page may be generated to reflect the transaction information as modified. In addition, subsequent versions of a transaction page may reference the previous versions in order to preserve an audit trail of the transactions, netting and settlements at the netting system, as seen in FIG. 2B. The transaction ID may be used to reflect different versions of a transaction. For example, the transaction page of FIG. 2B is version 2 of transaction T12245125612. Therefore, it has been assigned the ID number, T12245125612.2. Other methods of preserving an audit trail may be also be utilized.

The transaction data 204 corresponds to transactions that have been received at the netting system 100. According to the preferred embodiments of the present invention, a transaction may be associated with a collection and settled with other transactions only when the transaction is first made available for netting. The netting system may be configured to monitor the transaction data for an indicator that, when satisfied, may allow the netting system 100 to process the transaction in the manners discussed in this disclosure.

In one preferred embodiment, a transaction is available for netting when a denormalized transaction page is created in the netting database 112. This denormalized transaction page may be a copy of the transaction that is received at the netting system 100 and contain information related to the transaction itself, such as the transaction value, partner, price, currency, market and other information well known in the art. The denormalized transaction page may further contain additional information that is utilized in the operation of the netting system 100, such as the reference information and metadata information discussed above. As discussed in detail with the discussions of the netting engine 104, the creation of a denormalized transaction page may indicate to the netting engine 104 that the transaction is available for associating with a collection/rule and for settlement.

In other embodiments, the transaction that is received at the netting system may be directly stored at the transaction data 204 as a transaction page. In addition, the transaction page may contain a flag or other forms of indicators that, when triggered (i.e., an "available4Netting" variable equals "true"), allow the transaction page to be processed for netting. The netting engine 104 may monitor the netting database for changes of such variables.

Figure 2C:
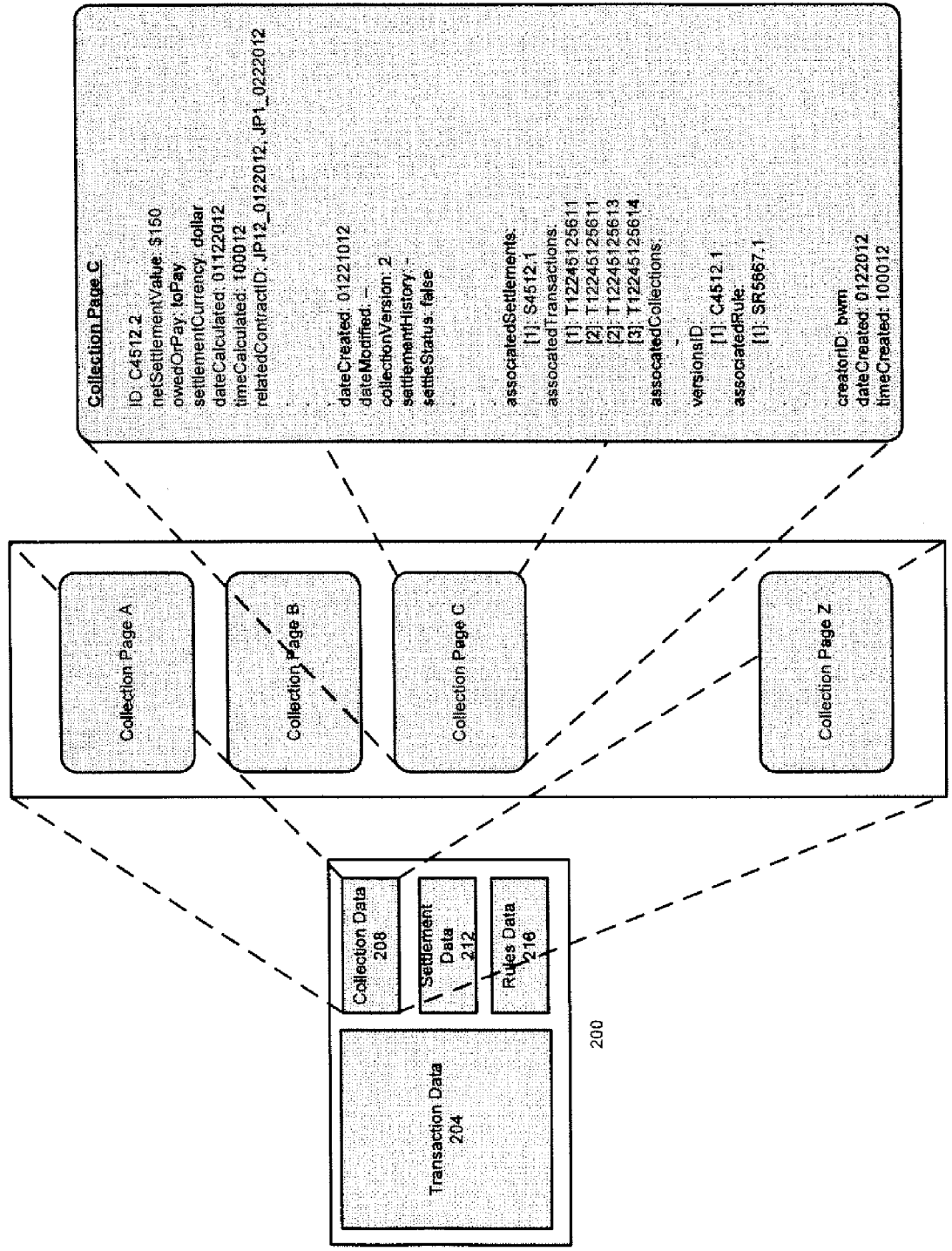
Figure 2D:
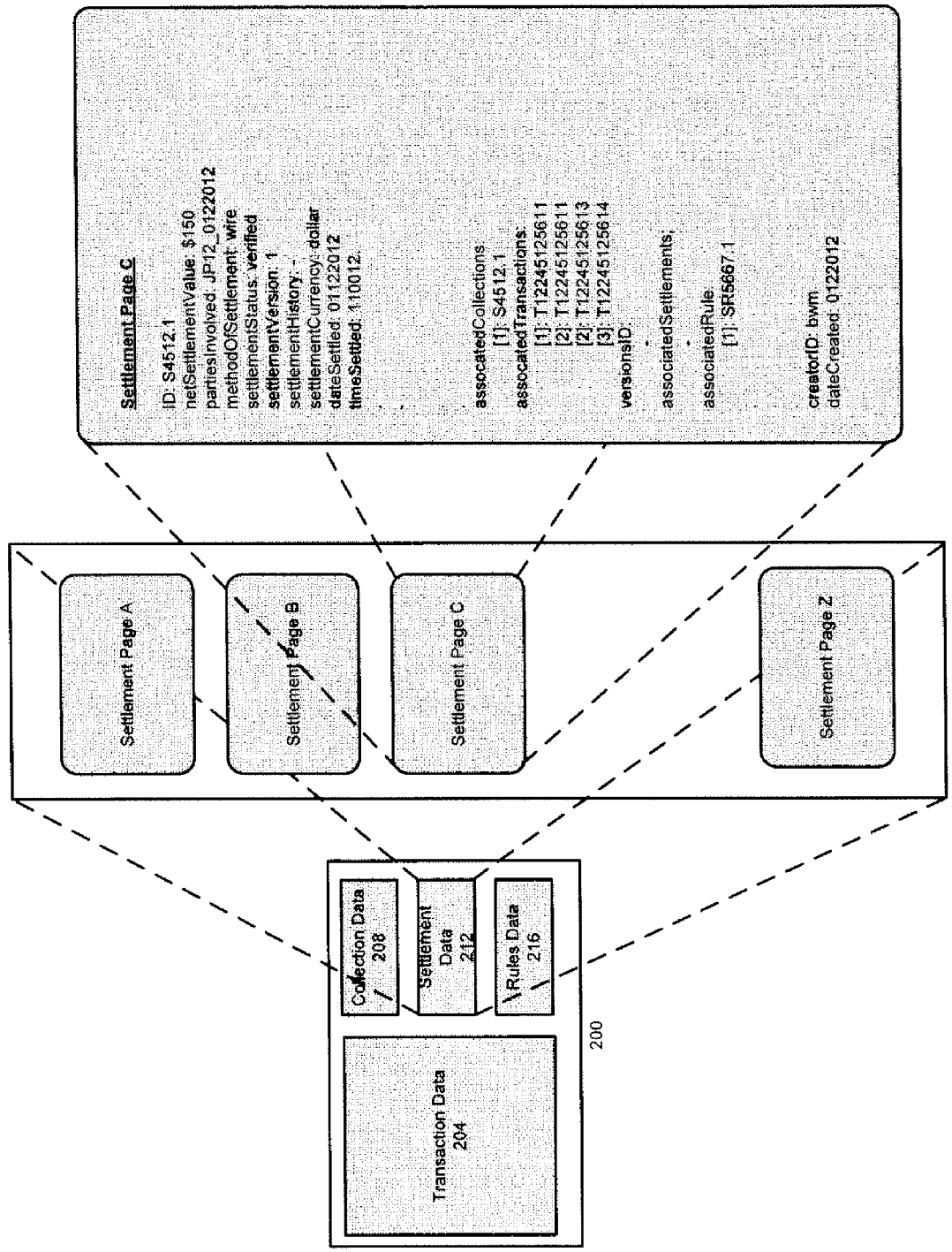

The collection data 208, similar to transaction data 204, contains data of collections in the form of collection pages, with each page corresponding to a collection. Each college page may include the collection identifier, the net settlement value, and the time that the net settlement value was determined, as seen in FIG. 2C. Furthermore, it contains reference data of each of the transactions associated with the collection. In at least one embodiment, each collection page also contains reference data identifying one or more settlement transactions in the settlement data 208 (e.g., a settlement page). Like the transaction pages, the collection pages may further contain reference data identifying previous and future versions of the collection page. In at least one embodiment, a collection page further references a netting rule that captured its associated transactions.

The settlement data 212 contains settlement records for each of the collections that have been settled. For each settlement, a settlement page in the settlement data 212 of the netting database 200 exists and may include a settlement identifier, the amount settled, the parties involved, the banks used, and transaction status (e.g., settlement verified, check sent, etc.). An exemplary settlement page is depicted in FIG.

2D. Each settlement page may further contain reference data to the collection that the settlement is associated with and contain reference data to past and future settlements.

Figure 2E:
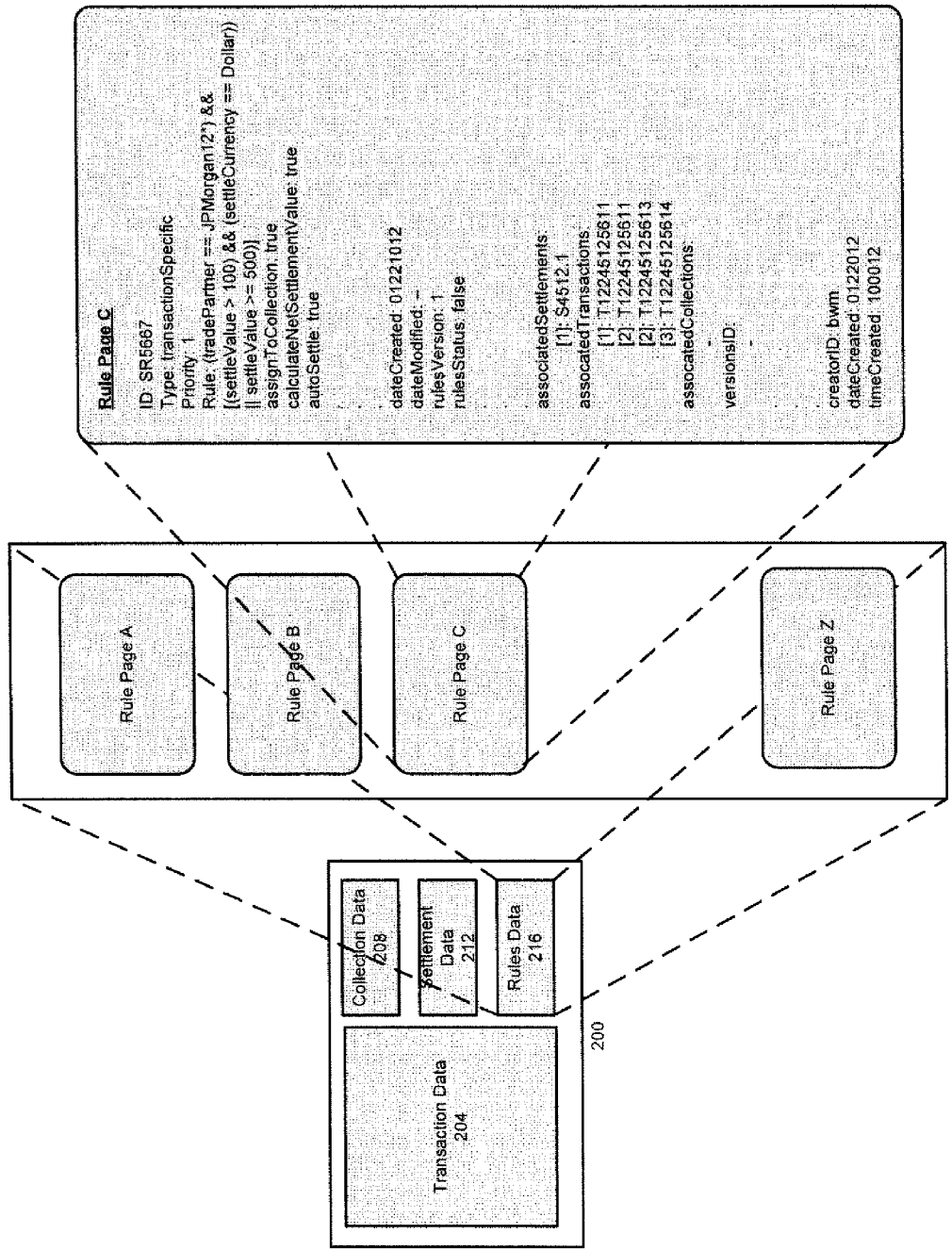

The rules data 216 may contain data for each of the rules that have been created and used in the past. Each rule, which may be stored in the rules data 216 as a rule page, such as the one depicted in FIG. 2E, may include a unique rule identifier, the rule type, the rule's hierarchal priority, and the netting rule itself (e.g., desired attributes of a transaction). In addition to the use of attribute variables and conditions, a rule may be defined according to the time that the transaction was completed or last modified (e.g., at least 1 hour before a cut-off time), or the status of the transaction (e.g., whether a settlement has been entered, whether it has been modified after settlement). More sophisticated rules may be created utilizing other databases that may be available to the netting engine. For example, a netting rule may be defined based on the size of a trading partner corporation, the interest rates set by financial regulators, profit margin of a subsidiary of the trading partner, and the current date relative to the fiscal quarter.

Each rule page may further define actions that the netting engine 104 may take upon the execution of the rule. In addition to checking the variables, conditions and other data in associating transactions with a collection, the rules may be configured to cause the netting engine 104 to calculate the net settlement value automatically or to automatically cause the settlement of the collection upon the completion of the association process, for example.

In at least one embodiment, various versions of rules, as they are revised, are also maintained at the netting database 200. Thus, each rule page may reference previous and future versions of rules. In some embodiments, rule pages may further contain reference information of each transaction or corresponding collections that it has captured when executed.

In some embodiments of the present invention, the netting database 200 may maintain the original data of transactions as they are completed. Indeed, the netting database 200, in some of these embodiments, may be utilized by other engines and systems external to the netting system, such as by the central transaction system.

The presently disclosed invention may be configured in a manner that ensures data integrity and allows for a complete audit trail. Transaction information may be stored in the form of denormalized transaction pages. In other words, the original transaction data, which may be stored at the netting system 100 or in other systems or databases of the company (e.g., the central transaction database 120 of FIG. 1B) is not directly manipulated by the netting system 100. Furthermore, all modifications and deletions to transaction, collection, rule, and settlement data, results in the creation of a new corresponding data page containing the data as modified or deleted. Thus, each version of a transaction, collection, rule and settlement may be stored at the netting database. Furthermore, the association between each transaction, collection, rule and settlement is also stored, along with any modifications of such relationships. Thus, a complete audit trail is maintained at the netting system 100. This allows for users of the system as well as outsiders (e.g., regulatory agency 136 of FIG. 1B) to track how an entity is performing its netting operations at any given moment. For example, based on a single settlement, a regulator may be able to determine all transactions associated with the settlement and related settlements, the various modifications made to each transaction from the creation of the transactions to the latest settlements, the various net settlement value calculated along the way, the person who approved the various settlements, the person who approved the initial transactions, and so on. In other words, the transactions, collections, settlements and rules in existence at the netting database at any given point in time may be traced forwards and backwards as necessary or desired.

While the netting database 200 is depicted in FIG. 2A as a single database, it may be implemented as one of a plurality of netting databases, with each database containing data of differing sets of transactions. In another embodiment, each database may contain a particular type of data or category of information, such as data of a particular type of transaction, data of collections, or data of settlements.

Rule Engine

The rule engine 108 manages the rules that are utilized by the netting system 100. In one embodiment, the rule engine 108 allows for a user of the netting system 100 to create, modify and remove netting rules through the use of a user interface. The user interface, for example, may allow the user to define the various attributes of transactions that the user would like to be associated with a collection, and in certain instances, to perform netting. The rule engine 108 may also automatically generate rules according to user actions. For example, in response to the selection of transactions for netting, the rule engine 108 may automatically generate a transaction-specific rule as to capture the transactions chosen.

In an embodiment, the user may further set, via the user interface, when netting rules in the netting system 100 may be processed. The rule engine 108, for instance, may be configured to execute each netting rule as they are created or modified and to process various transactions accordingly when a rule is removed. The rule engine 108 may also be configured to execute newly created rules or reexecute modified rules at regular intervals, at a scheduled time, or at the instruction of a user.

In one embodiment of the present invention, the rule engine 108 further has the capability to generate rules automatically without user request. It may generate rules to group transactions together according to the transactions available for netting, according to the conditions of the system, and according to information from external sources. The rule engine 108 may create not only general rules to present to the user the transactions in a manner that will facilitate the identification of transactions for netting, but the rule engine 108 may also propose transaction-specific rules that select transactions that should be associated for netting. It may automatically calculate the net settlement value of the resulting collections accordingly.

The rule engine 108 may examine the various transactions at the netting database 112 for patterns and trends, taking into consideration attributes of transactions that may be ideal for netting or simply those transactions that should be distinguished from other transactions. Attributes such as prices, quantity and the market used, may give fair indication of when a set of transactions should be associated together and provided to the user for netting. For example, the rule engine 108 may create a general rule to group all transactions with a particular trading partner together when it determines that the number of transactions with this trading partner is much greater than the average number of transactions with other trading partners. Similarly, it may group all transactions that are completed in a certain currency together, recognizing that the use of a particular currency in a transaction is rare. Furthermore, it may take into consideration the settlement dates of the transactions. Transactions that are nearing a contract settlement date may automatically be grouped with one another by the rule engine 108 for netting. In addition, conditions of the system may cause the generation of a netting rule. Transaction-specific roles may automatically be generated if the system is overloaded with unsettled transactions in order to facilitate the netting of the transactions and to free up system resources.

The rule engine 108 may further take into consideration historical data on settlements, netting and association when grouping one or more transactions via a general rule, taking into consideration internal and external records and data. It may choose transactions for netting that have similar attributes to those transactions that have been netted in the past. Similarly, it may generate rules that will capture a collection of transactions of similar structure or attributes to other collections of transactions that have been netted in the past. Further still, it may generate rules with net settlement values nearing what has been entered into in the past. Such determinations may also take into consideration previous records of user approvals of engine-generated rules.

The rule engine 108 may also automatically create such rules at preferable times and system conditions, according to common netting practices in the art. For instance, the rule engine 108 may automatically create a general rule at or near the daily cut-off time and it may associate dynamically the most number of transactions possible involving a common trading partner, currency and market that will result in a net settlement value of 0, or closest possible.

The rule engine 108 may provide the user with proposed netting rules for execution, including the transactions that would be involved and the net settlement value of the resulting collection should the rule be executed. In certain embodiments, the user may access, at any time, a dynamically generated list of proposed collections that are generated by the rule engine 108. The user may then select to view the potential effects of such transactions and may proceed to approve any one of the proposed collections. In these embodiments, the netting rules are therefore riot processed until a user has approved a propose rule. Thus, a proposed rule is just that, a rule that if executed, would result in the association of the determined transactions into a collection and result in a determined settlement value, if settled. In one embodiment, no transaction pages or collection pages are generated and stored at the netting database 112 until the user approves the netting rule for execution. In one embodiment, such proposed information is stored in the netting database 112 in a proposed data portion of the netting database 112. In another embodiment, such pages are generated and stored at the netting database 112 but may marked as proposed transactions, collections and settlement values.

The Netting Engine

The netting engine 104 facilitates the netting of financial transactions by organizing and identifying transactions for netting, determining the net position for each of these collections and causing the settlement of each of the netted transactions based on the net positions determined.

The netting engine 104 may be configured to operate with any type of transactions that require settlements between two or more trading partners. For example, a transaction may be a trade of financial securities, commodities and other tradable items and instruments of value in a financial market such as a stock market (both primary and secondary), bond market, commodity market, money market, foreign exchange market, insurance market or derivatives market. Transactions do not have to be completed through a financial market at all, but instead, may simply involve two or more parties directly exchanging commodities and instruments. Such transactions may be for a sale of a commodity (e.g., food, metals, electricity) in exchange for other goods or for cash. A transaction may also contain multiple unique obligations. In one preferred embodiment, trades are received and are entered into the netting system, with each trade containing numerous cashflows representing an individual obligation to the trading partner. In these embodiments, each cashflow may represent a transaction.

These transactions may involve any number and type of entities. The transactions may involve two or more financial entities that initiate and complete trades in one or more of the financial markets described above. For instance, the parties may be two or more investment banks, each making various trades with the other and accumulating a number of individual obligations over a period of time. Other types of entities may include individual companies, insurance companies, credit unions, financial advisers and brokers, pension funds, mutual funds, various collective investment schemes, and others. Indeed, a transaction may be completed by any entity that may have settlement needs, including any company that has outstanding debt or obligation with the same party across multiple transactions.

In a financial market trade, the transaction may be received when a stock purchase from a particular entity is complete. For example, a transaction may be completed through the use of the central transaction system 118 and provided to the netting system 100 for possible netting. The netting engine 104 may receive a transaction when it is completed or, in various embodiments, may retrieve transactions that have been completed at regular intervals, at a predetermined time or at a user's request. In yet another embodiment, the central transaction system 116 may provide the netting system 100 with notifications at regular intervals of transactions that have recently been entered at the central transactions system 116. The netting system 100 may retrieve some or all of the transactions based on the user's request or predetermined criteria.

In response to receiving a new transaction, the netting engine 104 may process the transaction by generating and storing a transaction page in the netting database 112. In one preferred embodiment, the netting engine 104 may generate a denormalized transaction page containing at least some of the transaction information received at the netting engine. In fact, in the preferred embodiment, it would contain all of the same data contained in the transaction. The denormalized transaction page, once generated and stored in the netting database 112, may further contain additional information that facilitates the operation of the netting system 100. In one preferred embodiment, each denormalized transaction page further contains reference data to transactions, collections, settlements and the various versions of each, as discussed in other portions of this disclosure.

Figure 4A:
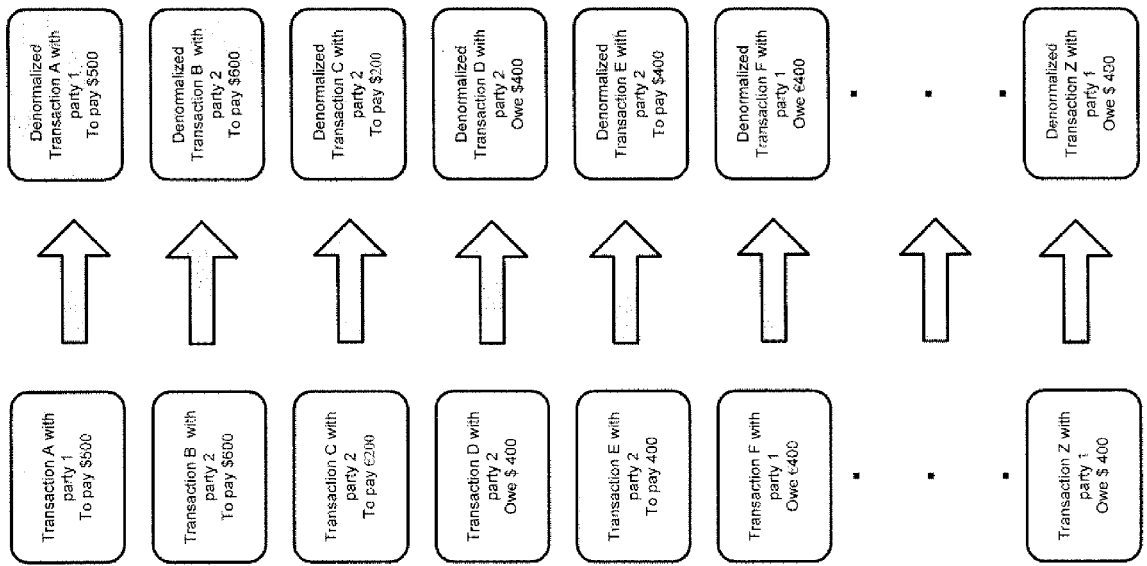
FIG. 4A is a block diagram illustrating the relationships between received transactions and denormalized transaction pages in accordance with embodiments of the invention.

FIG. 4A illustrates an exemplary set of transactions that may received at the netting system 100. As seen, the netting system 100 may generate a corresponding denormalized transaction page in the netting database 112 (represented as "denormalized transaction") for each of the transactions received.

The netting engine 104, in the preferred embodiment, may process a transaction for netting only when it is made available for netting. In one preferred embodiment, a transaction received at the netting system 100 is available for netting when a denormalized transaction page is created in the netting database 112, which may occur automatically when the transaction is received at the netting system 100. In another embodiment, a transaction is available when a flag or other indicators within a transaction page, indicate that the transaction is available for netting. Thus, the netting engine 104 may track the netting databases for new denormalized transaction pages or for such indicator changes. A user of the netting system 100, using a user interface, may select a transaction to be made available for netting from a set of transactions that have been received. As such, not all transactions received at the netting system of such embodiments are automatically made available for netting. Rather, only a subset of transactions specifically chosen by a user will be available.

When a transaction is available for netting, the netting engine 104 may associate the transaction page with one or more collections according to a hierarchy of netting rules. The netting rules may be executed to determine the association of a transaction in response to the generation of a denormalized transaction page. Furthermore, the netting engine 104 may be configured to associate one or more transactions with a collection at regular intervals, at predetermined times, or on command.

A transaction may not be associated with any collections right after it has been stored at the netting database 112, as it may be not be captured by any netting rule then in existence at the netting system 100. Instead, a transaction may subsequently be associated with a collection when a netting rule is created or modified (and in some cases when it is deactivated). Similarly, a transaction may be subsequently associated with a collection when the transaction is modified. Furthermore, a transaction may be associated with a collection through the selection by a user of the system through the use of a user interface. Thus, the user may select the specific transactions for netting, thereby automatically associating the transaction with other selected transactions into a collection.

The netting engine 104 identifies the transactions that should be associated with a collection by examining one or more attributes and/or conditions defined by the netting rules. Thus, when a transaction is made available for netting, the netting engine 104 may execute each netting rule to determine whether the transaction may be captured by a rule. Similarly, when a transaction is modified, each netting rule may be executed to determine the association of the transaction as modified.

The netting engine 104 may execute the netting rules according to the hierarchy of the netting rules. Higher priority rules may be processed against the received transactions first, followed by the lower priority rules. Thus, in the preferred embodiment, the transaction-specific rules may be processed first, followed by the general rules. FIG. 4B depicts an exemplary block diagram depicting the association of the transactions with collections 412, 416 and 420 according to transaction-specific rules 400 and 404 and general rule 408. As seen, transaction-specific rules 400 and 404 have priority over the general rule 408. The netting engine 104 may execute the general rule 408 after executing all transaction-specific rules, including rules 400 and 404. As illustrated, a user may identify that transactions B, C, D and E should be netted. Similarly, a user may identify transaction A as a transaction to be netted with other transactions associated with collection 412. In the illustrated case, transaction Z may be associated with collection 420 in accordance with general rule 408, a rule that captures all transactions greater than $250 and associates them with collection 420. Notice that even though general rule 408 sets forth attributes that also capture transactions A, B and D, their associations are dictated by transaction-specific rules 400 and 404, which have priority over the general netting rules, including rule 408. Furthermore, note that in FIG. 4B (and similarly in FIGS. 4C-4F), the transactions depicted may represent transactions that are available (e.g., via denormalization or flagging) for the netting engine 104 to perform netting operations on, such as associating the transaction with one or more collections.

As seen, a transaction may be associated with a collection even if there are not yet any other transactions from which the netting engine 104 may perform netting. A user may use this feature to make sure that any net settlement value that is calculated includes particular transaction A.

In certain embodiments, the hierarchy of netting rules may not be strictly followed by the netting engine 104. For example, when a transaction-specific rule is defined by a user of the netting system, the netting engine 104 may execute only the rule created. Thus, when a user selects a number of transactions for netting through a user interface or identifies through a transaction identifier the transaction for netting, the netting engine 104 may automatically associate the selected transactions with a collection as defined by the transaction-specific rule. The netting engine 104 may not execute other transaction-specific rules or general rules.

In some circumstances, only general rules may be executed. In one preferred embodiment, for example, the netting engine 104 may execute only the general rules when the netting system 100 receives a new transaction at the netting system 100. Because the transaction-specific rules only identify specific transactions that should be netted, processing efficiency may be achieved by avoiding the execution of transaction-specific rules altogether when a new transaction is just received at the netting system 100. Thus, this embodiment operates under the assumption that when a transaction has just been completed, it is unlikely that, when received at the netting system 100, the user has already chosen the transaction for netting, i.e., it is unlikely that a transaction-specific rule would identify the new transaction. Indeed, in certain embodiments, no such transaction-specific rules may yet exist when the transaction is received at the netting system 100, as the user cannot select the transaction and create a transaction-specific rule until it is associated with a collection via a general rule.

The transaction-specific rules may further associate the transaction page with one of several collections based on any number of attributes that describe a transaction, including a transaction's market information, currency of the trade, commodity traded, quantity of trade, schedule of trade and other information well known by a person of ordinary skill in the art. Thus, as seen in FIG. 4C, specific rule 404 may set forth that transactions that are selected, in this case transactions B, C, D and E, should be associated with different collections based on the currency used in each transaction. As a result, denormalized transactions B and D, which are dollar-based transactions, are associated with collection 416, while denormalized transactions C and E, which are euro-based transactions, are associated with collection 418.

The association of the transactions at the netting system 100 is also determined when a rule is created at the netting system 100. Thus, the netting engine 104 may reprocess all denormalized transaction pages in response to the creation, modification or removal of a netting rule. In one preferred embodiment, the processing of all transactions may be limited to only those transactions that are not associated with a transaction-specific rule and only when a general rule is created. In this embodiment, in response to the creation of a specific rule (e.g., through the specific selections of transactions by the user for netting), the netting engine 104 may process only the selected transactions. Further, in response to the modification, removal, or deactivation of a netting rule, the netting engine 104 may only examine the transactions previously captured by the netting rule.

Once transactions have been associated with at least one collection at the netting system 100, the netting engine 104 may determine a net transaction value for the collection according to netting accounting practices that are utilized and well known in the art by a person of ordinary skill. The netting engine 104, in particular, takes into consideration the settlement value for each of the transactions associated with a particular collection in determining the net settlement value. For example, the settlement values of each transaction may be aggregated to determine a net settlement value. Taking the transactions associated with collection 416 of FIG. 4B as an example, a net transaction value may be determined to be $800 owed to party 2 because in the aggregate, party 2 is owed a total of $1200 and, at the same time, owes $400. Rather than four separate transfers, one single payment may be made to settle transactions B, C, D and E.

in several embodiments of the present invention, the settlement position may be determined for a subset of transactions in a collection. A user, for example, may select the transactions that he or she would like to determine a net value from a collection of associated transactions that are provided in accordance with a transaction-specific rule.

The netting engine 104 may determine the net settlement value automatically in response to a generation of one or more collection pages in the netting database 112. A net settlement value may be determined automatically when one or more transactions are associated with a collection, when the set of transactions associated with a collection is modified, or when the attributes of any associated transaction (e.g., settlement value) are modified.

Once the netting engine 104 has determined the settlement values of a set of transactions, the netting engine 104 may provide the user of the system with the information via a user interface. Through the use of a user interface, such as at the client device 114 of FIG. 1B, the user may view the transactions from which netting may be completed. For example, the user interface may display the transaction partner, the transactions, the net settlement value and the currency of each collection of transactions. The user may select each collection (or sub-collection thereof) and approve or deny a transaction for netting. Through this determined information, the user of the system may communicate the transactions and settlement information with a representative of the trading partner through traditional methods such as the telephone or email. This negotiation and approval process may alter the transactions that are to be settled and the settlement values. Once the trading partner has approved the settlement, the user of the system may cause the transactions to be settled for the determined settlement value such as by indicating to the netting engine 104 that the collection of transactions are to be settled for the determined settlement value through the use of the user interface.

In another embodiment, the approval and negotiation process may be built into the system. At the direction of the user, the netting engine 104 may transmit a settlement request to the trading partner system, which may receive the request as an email or as other forms. Thus, a settlement request email generated and transmitted by the netting system 100 may include all of the information necessary to indicate to a representative of the trading partner the transactions for settlement, the settlement value, and other information. The settlement may also be scheduled according to a predetermined payment schedule. Similarly, the netting engine 104 may cause the settlement information to be transmitted to the financial market 130.

The email may, for example, contain a hyperlink or other similar functions, that when pressed, automatically causes the netting system 100 to receive notice of the approval of the settlement through the user interface. In another embodiment, the email may contain a link to a website that allows a representative of a trading partner to log in (e.g., authenticate) and view the settlement requests from the netting engine. The representative may utilize the website to approve, deny or modify the transactions that will be netted and the net settlement value or to propose transactions for settlement. The interface may allow the trading partner representative to select other transactions at the netting system 100 to be included (or similarly those that should be excluded) for netting.

In one embodiment, the netting engine 104 and trading partner systems may utilize a common application programming interface (API) that allows the system of the trading partner (e.g., trading partner system 126 of FIG. 1B) to receive and process the request transmitted from the netting engine 100. The trading partner system 126 may automatically display the settlement requests on a user interface including the settlement-related information. Just as with the request website, a user at the trading partner system 126 may approve, deny or modify the settlement request or propose transactions for settlement, all through the use of a user interface. The netting system 100, similarly, may automatically receive notice of the response and provide the user of the netting engine 100 with the response automatically. In at least one embodiment, if the response is an approval of the request, the settlement is automatically completed according to the settlement request.

Thus, in certain embodiments, including those in which a trading partner may propose, approve, deny or modify net settlement requests through the use of a web-accessible web site or through the use of an API, the netting system 100 may further be configured to provide to the user a list of trading-partner settlement requests and responses to requests.

Other forms of communications may be used other than email and network-based communications. For example, a voice message may be generated indicating all of the necessary information of the settlement proposal. Similarly, a text message may be generated and transmitted. A user of the trading partner who has received the message may reply to approve, deny, modify or propose new transactions. Thus, a user may interact via voice commands or through dial tones in response to a voice call or through preset commands via text messages. Furthermore, the netting system 100 may be configured to leave a voice message describing the proposed settlements or leaving a number to call back. Authentication may be necessary if these forms of requests are used. Other forms of communication are well within the scope of the invention including faxes, radio-based communications, application-based transmissions (e.g., mobile applications), traditional paper-based communications and others.

In at least one embodiment, netting engines of various financial institutions may automatically communicate with one another to negotiate a net settlement based on each institution's transactions, collections, settlements, netting rules, system conditions, preferences and other factors. The netting systems may automatically generate net settlement values and complete the settlement of the transactions involved without user intervention. The net settlement of transactions may also be negotiated and agreed upon by three or more netting systems.

It should be readily apparent that the present invention allows for the netting engine 100 to communicate its settlement requests, negotiate and receive responses from even preexisting computer systems of a trading partner through the use of an API or other methods disclosed herein.

Once a collection of transactions has been approved for settlement based upon an agreed upon settlement value, the netting engine 104 may further facilitate the settlement of the transactions. The netting engine 104 may communicate with one or more engines or components of the system that are responsible for the settlement of transactions with trading partners. The netting engine 104, for instance, may communicate to a settlement engine the specific transactions that are to be settled, the trading partners involved, the currency information, the settlement value, as well as other information that may be necessary in order for transactions to be settled according to well known accounting practices. In one embodiment, the netting engine 104 may have such settlement capabilities incorporated into the netting engine itself. The netting engine 104 may contact a bank 132 (FIG. 1B) and request a wire transfer of the net settlement value to a trading partner 134 (FIG. 1B) or a trading partner system 126 (FIG. 1B) via network 116 (FIG. 1B). Other forms of settlements may be used, in accordance with common settlement practices.

In at least one embodiment, the netting engine 104 may cause a notification to be provided to the trading partner 134, describing the settlement, describing the settlement, including the netting calculations and the transactions that are involved, to indicate that the settlement of the transactions have been completed.

At the same time or soon thereafter, the transaction pages in the netting database 112 may be updated to indicate that the individual transaction has been settled. Thus, as seen in FIG. 4D, a settlement 422 is completed and recorded for the transactions associated with the collection 416. In certain embodiments, each previous version of the transaction page may be marked as settled to prevent future settlements for the same transaction value. Furthermore, the net settlement may be stored in a settlement page within the netting database 112.

Figure 3A:
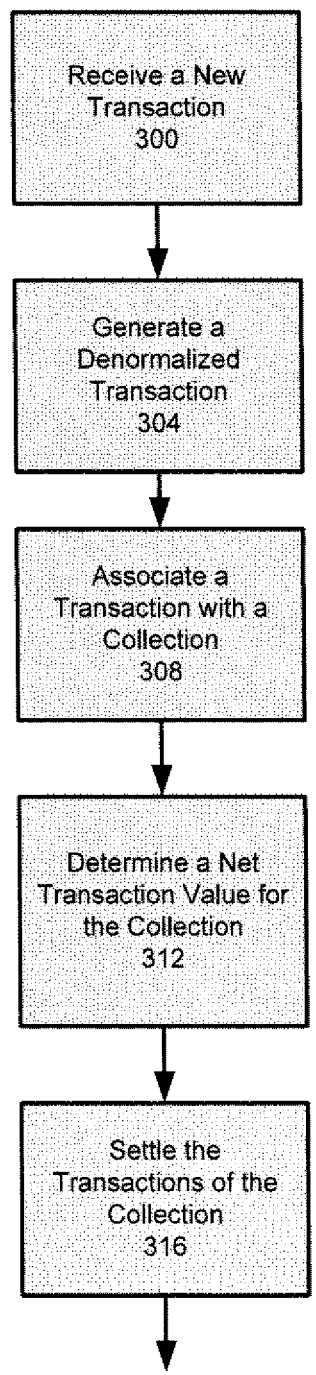
FIGS. 3A-B are flow charts illustrating exemplary methods in accordance with a preferred embodiment of the invention.

FIG. 3A depicts a flow chart of an exemplary netting method in accordance with a preferred embodiment of the invention. These steps, for example, may be performed at the netting engine 104. At step 300, a new transaction is received. At step 304, a denormalized transaction page may automatically be generated in response to each transaction received. The netting system 100 may then associate the denormalized transaction page with a collection according to one of a plurality of netting rules and in accordance with a rules hierarchy at step 308. Furthermore, at step 312, the net transaction value for each of the collection containing two or more transactions may be determined according to netting accounting practices well known and utilized in the art by a person of ordinary skill. At step 316, the netting engine 104 may facilitate the settlement of the transactions based on the determined net settlement value.

As a person of ordinary skill in the art would recognize, from time-to-time, modifications may be made to a transaction, even after a settlement has been made. Such modifications may include, but are not limited to, a change to the settlement value, to the parties involved, or the schedule of payments. In fact, a modification may be made to any information related to the transaction. In certain circumstances, a transaction may be canceled altogether. The netting engine 104 has the capability to react to such modifications and take into consideration such changes in calculating subsequent net settlement values.

Figure 3B:
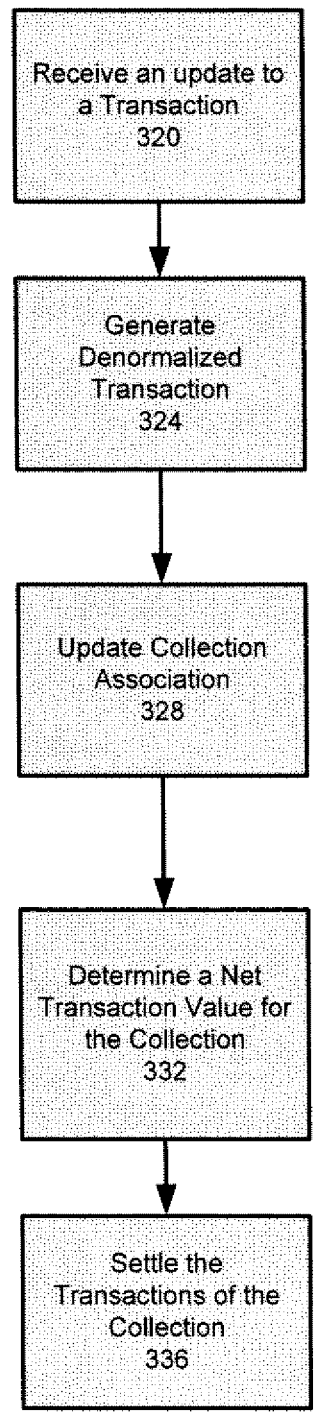

For example, FIG. 3B depicts a flow chart of an exemplary netting method in response to a modification to a transaction, in accordance with a preferred embodiment of the invention. At step 320, an update or modification may be received at the netting engine 100. The netting engine, in response, generates a denormalized transaction page at step 324, corresponding to the transaction that has been updated. At step 328, the association of the transaction may be updated according to the modified transaction. Furthermore, at step 332, the net transaction value for an updated collection containing the updated transaction may be determined. Finally, the transactions contained in the updated collection may be settled by the netting engine 104 at step 336.

Specifically, when a modification to a transaction is received at the netting system 100, the netting engine 104 may generates a new transaction page, which may be, in one embodiment, a denormalized transaction page containing the transaction information as modified. The present invention may generate additional denormalized transaction pages for each version of a transaction, each of which may contain information referencing the previous version of the denormalized transaction. This ensures that the netting system 100 maintains data integrity and a complete audit trail as discussed in detail in other portions of this disclosure. When flags or indicators are used within the transaction page to indicate transactions that are available for netting, the flags or indicators may be automatically activated when transaction pages are generated for existing transactions that have been modified or removed (i.e., new versions).

Figure 4E:
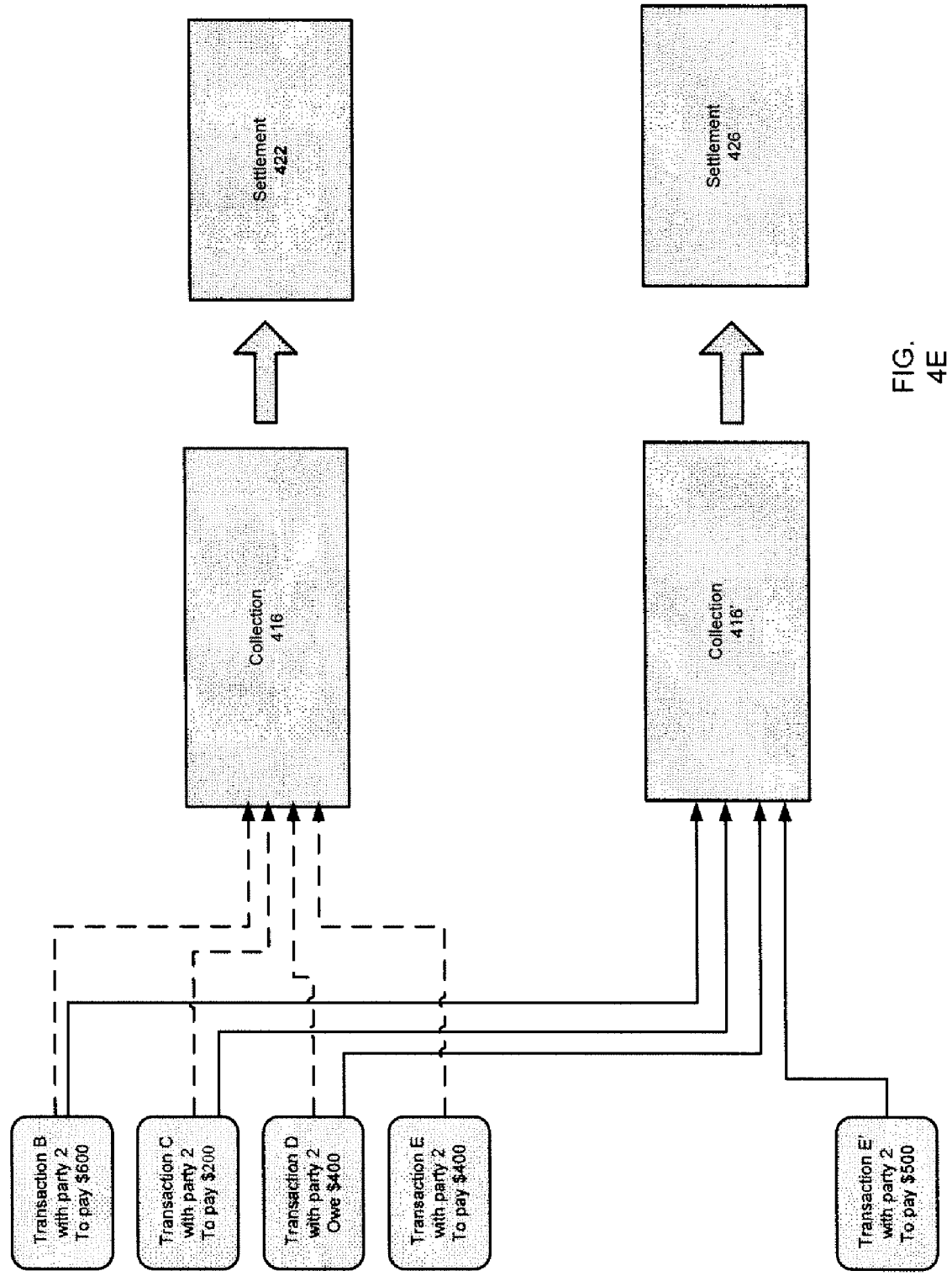
FIG. 4E is a block diagram illustrating the associations between transactions, collections, settlements and netting rules in response to modifications of a transaction in accordance with embodiments of the invention.
Figure 4F:
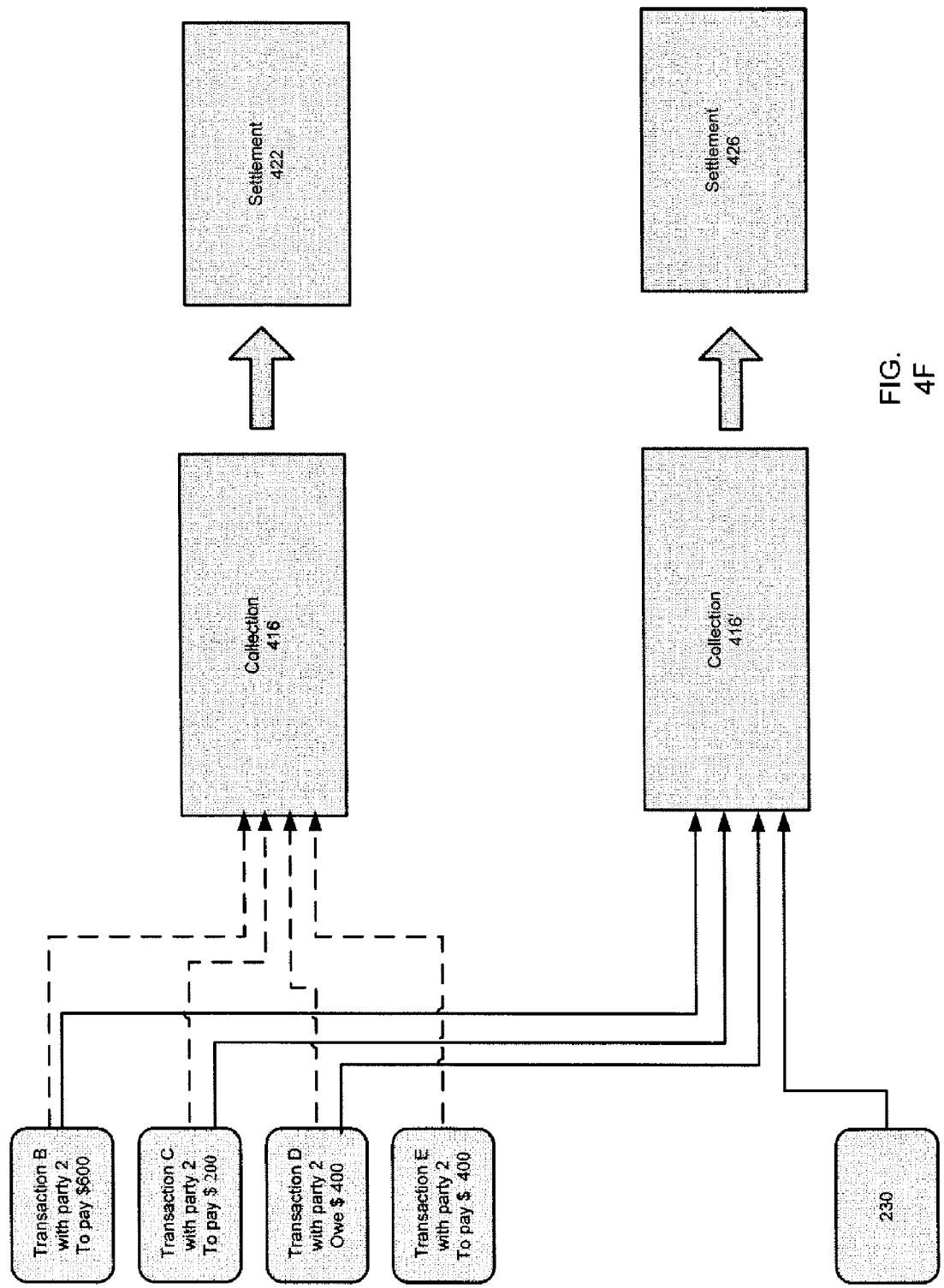
FIG. 4F is a block diagram illustrating the associations between transactions, collections, settlements and netting rules in response to a removal of a transaction in accordance with embodiments of the invention.

When a transaction is removed, the netting engine 104 may, nonetheless, generate a transaction page in the netting database 112. The transaction page may contain a null transaction value or data indicating that the transaction has been removed. The denormalized transaction page that is generated, referred to as a tombstone, may also reference previous versions of the transaction. An example of the transaction page after it has been removed is depicted in FIG. 4F.

In response to the generation of a denormalized transaction page or the activation of the netting flag/indicator, the netting engine may update the association of the transaction with a collection by executing one or more rules in similar fashion as the initial association of the transaction.

Based on the association of a transaction prior to its modifications, the netting rules that are executed in response may differ. For example, if the transaction was associated with a collection in accordance with a general rule, the netting engine 104 may reexecute all general rules once again to determine the proper association. The modification of the transaction, for example, may have altered an attribute of the transaction that causes the transaction to no longer be captured by the same general rule or causes the transaction to be captured by another netting rule. In contrast, if the transaction was associated with a collection in accordance with a transaction-specific rule, the netting engine 104 may automatically execute the same transaction-specific rule to determine whether the transaction-specific rule still captures the modified transaction. If not, the transaction may be disassociated from the transaction-specific rule and corresponding collection. The general rules may then be executed against the modified transaction.

In response to a modified transaction and a differing collection association, the netting engine 104 may create a new collection page in the netting database 112 and associate the generated denormalized transaction page with this new version of the collection. The collection page may reference the previous versions (i.e., collection pages of previous versions). As seen in FIG. 4E, where the transaction E has been modified to transaction E', containing an increased settlement value of $500, the netting engine 104 may associate transaction E' with a collection 416', along with transactions B, C and D, as previously. As a person of ordinary skill in the art would recognize, the previous version of transaction E—represented as denormalized transaction E—is accordingly not associated with collection 416'. However, it should be noted that the collection page of collection 416 in the netting database 112 may still reference the same denormalized transactions B, C, D and E, even though transaction E has been modified and transactions B, C, and D are also associated with collection 416'. In other words, previous versions of collections, transactions rules, and settlements are not modified where the underlying transactions have changed apart from the addition of reference data. Indeed, collection 416' may contain information referencing collection 416 and vice versa. Even where a transaction is removed, a collection 416' may nonetheless reference the tombstone denormalized generated page, as seen in FIG. 4F.

In response to the association of the new transaction page with a collection, the net transaction value may be determined according to netting accounting practices that are utilized and well known in the art by a person of ordinary skill, similar to the calculations of the net transaction value of the collection prior to a transaction modification. The settlement value for each of the transactions associated with a particular collection 416' may be taken into consideration to determine the net transaction value. Furthermore, the netting engine 104 takes into consideration previous settlements. In fact, where a settlement has been completed previously, differences between the previous net-settlement value and the settlement value of collection is determined. The result is the net-settlement value reflecting the modifications made to the transaction. For example, the net-settlement value of the transactions associated with collection 416 was $800, which was settled previously with party 2. In response to the modification of the transaction value of transaction E (increasing the settlement value to $500), the net settlement value based on the associated transactions is $900. However, because an $800 settlement was previously completed, the net settlement value of collection 416' is determined to be $100. Thus, when a settlement was previously entered, only this difference in the settlement value needs to be paid to entity 2. Once a net settlement value is determined, the settlement may be entered and completed in similar fashion as with the initial settlement.

The netting engine 104 further has the capability to process modifications or removal of netting rules. When a general rule is modified, the netting engine 104 may reexecute each general rule and determine the association of each transaction in the netting system 100. In one embodiment, the netting system 100 may only reexecute the modified rule against each of the transactions previously captured by the rule.

When a transaction-specific rule is modified, the makeup of the collections may change entirely; transactions that may be captured by a particular transaction-specific rule may no longer be captured by any transaction-specific rule, may be captured by a general rule, or may not be captured by any rule at all. As a result, the netting engine 104 may execute all transaction-specific rules and the general rules against all transactions at the netting system 100. Using FIG. 4B as an example, in response to a change in specific rule 404, the netting engine 104 may examine each of the transactions A through Z against specific rules 404, 408 as well as general rule 412. The resulting collections may differ dramatically.

As a person of ordinary skill in the art may recognize, when a modification is made to either types of rules, the netting system 100 may be required to reprocess the rules for each of the transactions at the netting system 100. In fact, the amount of resources and processing efforts utilized by the netting engine 104 may be especially substantial when a transaction-specific rule is modified. Indeed, the differences in the processing power that is required to effectuate a modification to a specific rule versus a general rule may be dramatic because in actual practice the netting system 100 may contain tens of thousands of transaction-specific rules while only containing tens or a few hundred general rules that need to be reexecuted.

In one preferred embodiment, the reexecuting of specific rules may be avoided altogether in response to the modification, deactivation or removal of a transaction-specific rule. By including information within each transaction page at the netting database 112, indicating the transaction-specific rule that captures a particular transaction, all of the specific rules need not be reexecuted each time a transaction-specific rule is modified. Rather, this information, which may be included within each transaction page as "specificRule" variable, may reference the rule that captures the transaction. Thus, in the exemplary method shown in FIGS. 3A-B, when a transaction is associated with a collection (steps 308, 328), the specificRule variable contained within the transaction page may be modified to reference the transaction-specific rule.

Similarly, when a transaction-specific rule is created that causes a transaction previously captured by a general rule to be captured by a transaction-specific rule, the specificRule value may simply be modified to reference the specific rule. The netting engine 104 may automatically execute the transaction-specific rule referenced in response to any changes in value of specificRule. Under this implementation, no other specific rules need to be processed.

If a transaction-specific rule is modified, the netting engine 104 may determine all transactions that are captured by the modified rule by examining the specificRule variable value. In response, each of these transactions may be reexamined against the modified transaction-specific rule. Where a transaction is no longer captured by the transaction-specific rule as modified, the netting engine 104 may modify the specificRule value of a transaction page to a null value. The change in the value of specificRule may cause the netting engine 104 to automatically execute all general rules to determine the transaction, and the association of the transaction. As seen, this feature importantly avoids the reexamination of all of the transaction-specific rules and saves much processing resources. In one embodiment, the specificRule value further indicates the general rule with which it may be associated with.

Furthermore, if a transaction-specific rule is deleted or simply deactivated, the value of specificRule may simply be modified once again to a null value. This may automatically cause the netting engine 104 to automatically reexecute the general rules to determine transaction association.

While the use of the specificValue may still require the netting engine 104 to reexecute all general rules, the resources and processing that this may require is minimal relative to those required in reexecuting each transaction-specific rules, which may number in the thousands.

In one embodiment, the specificRule value further indicates the general rule with which it may be associated with. In another embodiment, the netting engine 104 records and tracks the netting rules that each transaction may be captured by. For each transaction previously captured by a modified netting rule, the netting engine 104 may be configured to automatically determine the most recent netting rules that have captured the transaction and predict therefrom a netting rule that may apply. By this method, further efficiency may be achieved by minimizing the netting rules that are examined in response to the modification, deactivation and removal of a netting rule.

The above-described exemplary method provides a general description of one of several aspects of the invention which dynamically determines, groups and processes any number of transactions according to known netting accounting practices through the use of a hierarchy of netting rules. These examples and embodiments are merely illustrative of the netting system of the present invention. While particular embodiments of the invention have been illustrated and described in detail herein, it should be understood that various changes and modifications might be made to the invention without departing from the scope and intent of the invention. Indeed, it should be readily apparent to one of ordinary skill in the art that the presently disclosed alert system may be modified to operate in an operational banking computer system.

From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims.

The invention claimed is:

1. A computer system to dynamically manage transactions for netting one or more transactions associated with a collection, the computer system comprising:
    a database stored in memory, the database including netting data of the one or more transactions, the netting data of each of the one or more transactions including a rule identifier;
    a netting engine, using processor components, to perform at least the following operations:
        receiving the one or more transactions;
        automatically associating the one or more transactions with a general collection in accordance with a general rule in a general rule set in response to the receiving of the one or more transactions,
        automatically updating the netting data associated with the one or more transactions in response to the associating of the one or more transactions with the general collection,
        automatically associating the one or more transactions with a specific collection in accordance with a specific rule in a specific rule set in response to modifying the rule identifier to identify a rule in the specific rule set,
        determining a net transaction value for the specific collection,
        causing a settlement of the one or more transactions associated with the netting group based on the determined net transaction value, and
        automatically updating the netting data associated with the of the one or more transactions in response to the causing of the settlement; and
    a rule engine for automatically generating rules in at least one of the specific rule set or the general rule set, each rule defining attributes of one or more transactions including at least one of the following,
        currency,
        trading partner,
        amount of transaction, and
        date of transaction.

2. The computer system of claim 1, wherein the netting engine further performs the following operations:
    disassociating the one or more transactions from the specific collection in response to modifying of the rule identifier to null or to a rule in the general rule set; and
    associating the one or more transactions with the general collection according to the rule in the general rule set.

3. The computer system of claim 1, wherein the netting engine associates the one or more transactions with a collection based on a general rule in the general rule set where the one or more transactions are not associated with at least one collection based on a specific rule in the specific rule set.

4. The computer system of claim 1, wherein the rule identifier identifying a rule in the general rule set or the specific rule set.

5. The computer system of claim 1, wherein the netting engine automatically associates the one or more transactions with a collection based on a general rule set and a specific rule set when the one or more transactions are received or amended.

6. The computer system of claim 1, wherein the netting engine automatically disassociates the one or more transactions with the general collection or the specific collection based when the one or more transactions are removed.

7. The computer system of claim 1, wherein the netting engine further performs the operation of automatically updating the netting data of the one or more transactions in response to the associating or determining operation.

8. The computer system of claim 1, wherein the netting engine further performs the operation of selecting a rule.

9. The computer system of claim 8, wherein said modifying the rule identifier comprises modifying the rule identifier to identify said selected rule.

10. The computer system of claim 8, wherein said selecting is based upon a priority.

11. The computer system of claim 8, wherein said selecting is based upon an attribute of the one or more transactions.

12. The computer system of claim 10, wherein the priority is based upon historical data.

13. The computer system of claim 10, wherein the historical data comprises historical data associated with settlement, netting or association.

* * * * *